United States Patent
Karuppiah et al.

(10) Patent No.: US 8,520,556 B2
(45) Date of Patent: Aug. 27, 2013

(54) TERMINAL AND N-TREE CONSTRUCTING METHOD

(75) Inventors: Ettikan Kandasamy Karuppiah, Selangor (MY); Kok Hoong Yap, Petaling Jaya (MY); Boon Ping Lim, Puchong (MY); Pek Yew Tan, Singapore (MY); Eiichi Muramoto, Kanagawa (JP); Thoai Nam, Ho Chi Minh (VN)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 12/865,134

(22) PCT Filed: Dec. 26, 2008

(86) PCT No.: PCT/JP2008/004017
§ 371 (c)(1),
(2), (4) Date: Jul. 29, 2010

(87) PCT Pub. No.: WO2009/098748
PCT Pub. Date: Aug. 13, 2009

(65) Prior Publication Data
US 2011/0002333 A1    Jan. 6, 2011

(30) Foreign Application Priority Data

Feb. 8, 2008 (JP) ................................. 2008-029771
Dec. 1, 2008 (JP) ................................. 2008-306671

(51) Int. Cl.
*H04L 12/28* (2006.01)
(52) U.S. Cl.
USPC ............................................................ 370/256
(58) Field of Classification Search
USPC ................. 370/229, 232, 231, 260, 256, 252, 370/254, 389, 390, 498, 468
See application file for complete search history.

(56) References Cited

U.S. PATENT DOCUMENTS

| | | | | |
|---|---|---|---|---|
| 6,965,573 B1* | 11/2005 | Mizukoshi | .................... | 370/252 |
| 7,366,199 B1* | 4/2008 | Vaughan et al. | .............. | 370/468 |
| 7,552,275 B1* | 6/2009 | Krishnan | ...................... | 711/108 |
| 2001/0034793 A1* | 10/2001 | Madruga et al. | .............. | 709/238 |
| 2004/0236863 A1* | 11/2004 | Shen et al. | ..................... | 709/231 |
| 2004/0267694 A1* | 12/2004 | Sakai et al. | ........................ | 707/1 |
| 2005/0080894 A1 | 4/2005 | Apostolopoulos et al. | | |
| 2005/0243722 A1 | 11/2005 | Liu et al. | | |
| 2005/0243740 A1* | 11/2005 | Chen et al. | ..................... | 370/256 |
| 2006/0153100 A1* | 7/2006 | Dube et al. | ..................... | 370/256 |

(Continued)

OTHER PUBLICATIONS

Min Sik Kim et al.. "Optimal Distribution Tree for Internet Streaming Media.", Proceedings of the 23rd IEEE ICDCS, May 2003.
Miguel Castro et al., "SplitStream: High-bandwith content distribution in cooperative environments", IPTPS, Feb. 2003, http://iptps03.csberkeley.edu/final-papers/splitstream.pdf.

(Continued)

*Primary Examiner* — Hassan Phillips
*Assistant Examiner* — Ajay Cattungal
(74) *Attorney, Agent, or Firm* — Greenblum & Bernstein, P.L.C.

(57) ABSTRACT

A terminal apparatus minimizes traffic congestion by reducing end-to-end delay and maximizes the bandwidth available in shared N-tree ALM nodes. In this terminal apparatus, an optimal stream path information table stores N-tree session information for all nodes. A server forwarding table stores bandwidth-fair ALM route information for all nodes in a specific N-tree session. An ALM forwarding table constructor updates N-tree session information stored in an optimal stream path information table using network metrics and heuristic rules stored in a heuristic rule database, executes ALM_N-tree algorithm using updated N-tree session information, and thereby generates bandwidth-fair ALM route information.

10 Claims, 19 Drawing Sheets

(56) References Cited

U.S. PATENT DOCUMENTS

| | | |
|---|---|---|
| 2006/0251062 A1 | 11/2006 | Jain et al. |
| 2007/0070890 A1* | 3/2007 | Rojahn ............................ 370/229 |
| 2007/0086366 A1* | 4/2007 | Luo et al. ........................ 370/260 |
| 2007/0110063 A1* | 5/2007 | Tang et al. ..................... 370/390 |
| 2007/0248067 A1* | 10/2007 | Banerjea et al. ............... 370/338 |
| 2007/0274227 A1* | 11/2007 | Rauscher et al. .............. 370/252 |
| 2007/0280108 A1* | 12/2007 | Sakurai ........................... 370/232 |
| 2008/0002576 A1* | 1/2008 | Bugenhagen et al. ......... 370/229 |
| 2008/0232405 A1* | 9/2008 | Gallo .............................. 370/498 |
| 2009/0080426 A1* | 3/2009 | Ozugur et al. ................. 370/390 |
| 2009/0259811 A1* | 10/2009 | Krishnan ........................ 711/108 |

OTHER PUBLICATIONS

Kenichiro Takano et al., "Application Multicast Construction Method Tree for Many-to-Many Videoconferencing System", IPSJ SIG Technical Reports vol. 2005 No. 58, pp. 41-46 (Jun. 2005).

Kenichiro Takano et al.. "Distributed Progressive Method of ALM Tree Construction for Bi-Directional Real-Time Multimedia Communication", IEICE Technical Report, vol. 106, No. 237, pp. 25-29 (Sep. 2006).

Yoshitaka Taki et al., "A construction method of streaming delivery network with multi-tree on application layer.", IEICE Technical Report. vol. 103, No. 311, pp. 77-80 (Sep. 2003).

* cited by examiner

US 8,520,556 B2

TERMINAL AND N-TREE CONSTRUCTING METHOD

TECHNICAL FIELD

The present invention relates to a terminal apparatus and N-tree (multiple tree) construction method for allowing fair sharing of bandwidth for N-trees.

BACKGROUND ART

Multipoint communication, especially multipoint communication over the Internet, is for the most part implemented by multicast methods, whereby the same content is delivered to all participating nodes in the session at the same time.

IP multicast has a problem with its complexity with respect to the intermediate node configuration, end node configuration and requirement for Internet service provider participation, for enabling IP layer multicasting. By contrast, application layer multicasting ("ALM") implements an application layer routing mechanism on top of existing unicast network architectures. ALM is popular and widely used because of its simplicity.

ALM does not require multicast forwarding functions in the IP layer and therefore allows flexible audio video ("AV") packets forwarding by the members themselves between the participating nodes and AV packet transferring in the application layer.

ALM allows all participants in a specific session to exchange AV contents and streams between the participants without setting up the environment in advance. ALM is therefore suitable for use with AV-based applications such as TV conference between multiple parties.

However, the number of AV streams to be exchanged between participating nodes increase in order of N×(N−1) for N members. It is generally difficult to maintain fair communication costs in a communication network in terms of bandwidth and latency, especially in the Internet environment between end nodes. The Internet as an open network does not guarantee bandwidth-fairness between ALM nodes during the exchange of AV streams by the participating nodes.

Since multiple internet service providers ("ISPs") maintain routes on the Internet, which is dynamic in nature, minimal stream delivery delay tree building and maintenance for multiple trees is difficult. Routers use unicast route control methods to establish communication channels by detecting the channels connection status which is vary dynamically. Optimal route information is calculated based on available channels for communication use in the Internet. Next, this optimal route information will be exchanged between the routers for audio video communication. In contrary, multicast route control method builds source base trees, in which the transmission source is placed at the root node, using unicast routes as the basic information. Multicast route control method builds route without using information which is required to allow participants of multipoint-to-multipoint communication to use equal bandwidth or information for minimizing the delay. Thus, usage of existing route control technologies as-it-is for route calculation between terminals targeting multipoint-to-multipoint audio video communication will not provide equal share bandwidth link and minimal delay link routes between participant nodes.

Packet routing is carried out in application layer for ALM, so that the participating nodes are organized into groups. Furthermore, in packet routing, the packet forwarding mechanism needs to be made known to all participating nodes.

Network layer routing mechanisms provides short-sited, nearest path construction methods, and therefore does not provide bandwidth-fair distribution tree solution. For the network layer routing mechanism, SBT and minimum spanning tree ("MST"), which are based on the "greedy" concepts of Dijkstra, Bellman-Ford and Prim algorithms for short path formation, are well known. The unicast packet routing over the Internet is based on these algorithms and does not reflect the need for ALM routing.

Thus, these solutions do not take into account the end node network bandwidth and overall network topology, and therefore cause traffic congestion. Furthermore, these solutions cause high network latency and degradation of AV quality for ALM applications.

Hereinafter, the prior art, that is, prim-MST algorithm mechanism will be described using a simple example (FIG. 1). FIG. 1 shows four different locations, that is, Vietnam (VN), Japan (JP), Malaysia (MY) and Singapore (SG), where the capacity of bandwidth B(X) of the channel for each node and the delay D(A, B) between two nodes vary. In this example, transmission rate sets/slots for 8 Mbps, 4 Mbps, 3 Mbps or 2 Mbps are used.

In this case, if the conventional, Prim-MST algorithm based on a "greedy" algorithm mechanism is executed, each of one-to-N distribution trees for N nodes (N=4 in this example) can be calculated as follows.

(1) First, a path for transmitting packets to other nodes is selected for MY, where the available bandwidth is the largest. To be more specific, first, it is necessary to consider whether or not MY is able to secure an 8 Mbps bandwidth for all the other nodes. In this case, if a path is selected through which MY can transmit packets to VN and SG directly, an 8 Mbps bandwidth can be secured. However, the delay D=300 ms between MY and JP exceeds the maximum latency 250 ms, and therefore it is not possible to select a path through which MY can transmit packets directly to JP. Then, for the packet transmission from MY to JP, a path is selected through which packets are transmitted via SG. By this means, MY is able to secure an 8 Mbps bandwidth for JP (FIG. 2A). As a result, the remaining bandwidth is 20 Mbps for MY, 12 Mbps for SG, 16 Mbps for JP and 6 Mbps for VN.

(2) Next, for SG, where the original available bandwidth is the second largest, a route for transmitting packets to other nodes, is selected. To be more specific, first, it is necessary to consider whether or not SG is able to secure an 8 Mbps bandwidth for all the other nodes. However, if SG secures an 8 Mbps for MY and for VN (8 Mbps×2), the remaining bandwidth for SG exceeds 12 Mbps. SG therefore cannot secure an 8 Mbps bandwidth. Then, next, it is necessary to consider whether SG is able to secure a 4 Mbps bandwidth for all the other nodes. In this case, if a path is selected through which SG is able to transmit packets directly to MY and VN, it is possible to secure a 4 Mbps bandwidth. Furthermore, if a path is selected through which packets are transmitted from SG to JP via VN, SG is able to secure a 4 Mbps bandwidth for JP (FIG. 2B). In this case, the remaining bandwidth is 20 Mbps for MY, 4 Mbps for SG, 16 Mbps for JP and 2 Mbps for VN.

(3) Next, for JP, where the original available bandwidth is the third largest, a route for transmitting packets to other nodes, is selected. To be more specific, first, it is necessary to consider whether JP is able to secure a 4 Mbps bandwidth for all the other nodes. In this case, if a path is selected through which JP is able to transmit packets directly to SG and VN, it is possible to secure a 4 Mbps bandwidth. Furthermore, if a path is selected through which packets are transmitted from JP to MY via SG, JP is able to secure a 4 Mbps bandwidth for MY (FIG. 2C). In this case, the remaining bandwidth is 20 Mbps for MY, 0 Mbps for SG, 8 Mbps for JP and 2 Mbps for VN.

(4) Finally, for VN, where the original available bandwidth is the smallest, a route for transmitting packets to other nodes, is selected. Now, the remaining bandwidth for VN is 2 Mbps, so that a path is selected through which VN is able to transmit packets directly to MY and a 2 Mbps bandwidth is secured. Furthermore, if a path is selected through which packets can be transmitted from VN to JP via MY, VN is able to secure a 2 Mbps bandwidth for JP. Furthermore, if a path is selected through which packets are transmitted from VN to SG via MY and JP, VN is able to secure a 2 Mbps bandwidth for SG (FIG. 2D).

Thus, with the conventional (Prim-MST) N-tree algorithm by constructing N of one-to-N source-based trees, it is possible to establish a TV conference enable the ALM system to establish N-to-N TV conference sessions between participating nodes. This method satisfies the latency requirement based on SBT.

Non-Patent Document 1: Min Sik Kim et. al, "Optimal Distribution Tree for Internet Streaming Media", Proceedings of the 23rd IEEE ICDCS, May 2003
Patent Document 1: U.S. Patent Application Publication No. 2006/0251062
Patent Document 2: U.S. Patent Application Publication No. 2006/0153100
Patent Document 3: U.S. Patent Application Publication No. 2005/0080894
Patent Document 4: U.S. Patent Application Publication No. 2005/0243722

DISCLOSURE OF INVENTION

Problems to be Solved by the Invention

However, the conventional N-tree algorithm performs the calculations for the individual trees without coordinating between the trees over the process of constructing N-trees, fairness of bandwidth is not satisfied between N of one-to-N trees.

In the case of FIG. 2, the conventional N-tree algorithm can secure only a 2 Mbps bandwidth for VN.

Furthermore, if bandwidth-fair N-trees are constructed using the conventional N-tree algorithm, calculation needs to be performed for all combinations, so that, if the number of members increases, the amount of calculations increases exponentially and consequently the amount of calculations becomes enormous.

It is therefore an object of the present invention to provide a terminal apparatus and N-tree construction method for constructing N-trees that minimize traffic congestion by reducing end-to-end delay, and that, furthermore, maximize the bandwidth available between shared N-tree nodes and enable fair bandwidth sharing between all ALM nodes.

Means for Solving the Problem

The terminal apparatus of the present invention sets up a packet transmission route between nodes in multipoint-to-multipoint communication, and employs a configuration having: a metric collector that, using address information which specifies members participating in the multipoint-to-multipoint communication, measures a bandwidth of a link and a round trip time between the members, and stores measurement results in a metric database; an application layer multicasting table constructor that, using the measurement results, forms a packet transmission path (N-tree) between the members, such that a bandwidth is equal, and stores the packet transmission path in a server forwarding table; an application layer multicasting forwarding table distributor that converts the packet transmission route set up by the application layer multicasting forwarding table constructor into information that can be represented as a combination of an incoming port number, a destination address and a destination port number, and reports the information to the members.

Furthermore, the N-tree construction method of the preset invention includes the steps of: (a) ordering application layer multicasting members in an initial list with reference to metric collector information and group membership information for all nodes; (b) ordering the members of the initial list in an ordered list based on a first heuristic rule, for all nodes in the N-tree; (c) selecting members from the ordered list fulfilling a link connection status with respect to other nodes in the N-trees based on a second heuristic rule and ordering the members in a rule-based ordered list for each N tree; (d) selecting, from the members of the rule-based ordered list and the members in the initial list, two members having a logical connection satisfying a third heuristic rule as pair nodes and ordering the pair nodes in the rule-based pair list; (e) selecting, from node pairs in the rule-based pair list, selecting members satisfying a fourth heuristic rule; (f) forming an N-tree of a root node selected from the initial list, for all receiving nodes in a group based on a fifth heuristic rule; (g) assuring connecting all links between nodes of a specific N-tree; (h) assuring all nodes in the specific N-tree based on nodes of the initial list included in a N-tree configuration; and (i) assuring all N trees based on the nodes of the initial list included in a plurality of N-tree configurations.

Advantageous Effect of the Invention

According to the present invention, by utilizing combination of heuristic approach, metric information, and ALM forwarding table construction and distribution by continuous path information maintenance, it is possible to reduce end-to-end node delay, minimize traffic congestion and maximize the bandwidth available for use in shared N-tree nodes.

BEST MODE FOR CARRYING OUT THE INVENTION

An embodiment of the present invention will be described below in detail.

The present inventor names the N-tree algorithm of the present invention the "water-spread" policy. The N-tree algorithm of the present invention builds N trees for N sources, based on the "water-spread" policy. Furthermore, the N-tree algorithm of the present invention applies the "water-spread" policy to each of N resources simultaneously, so as to make possible bandwidth-fair trees.

Figure 1:
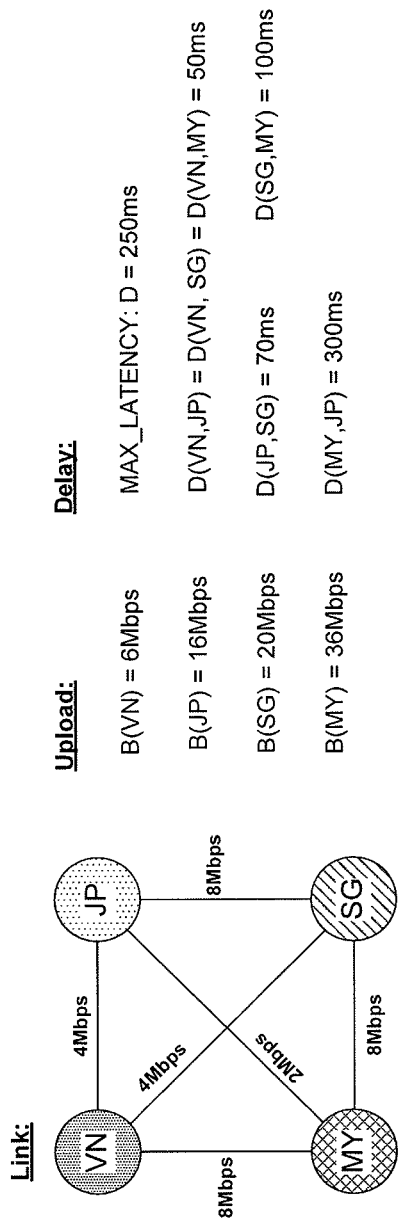
FIG. 1 shows preconditions upon execution of N-tree algorithm.
Figure 2D:
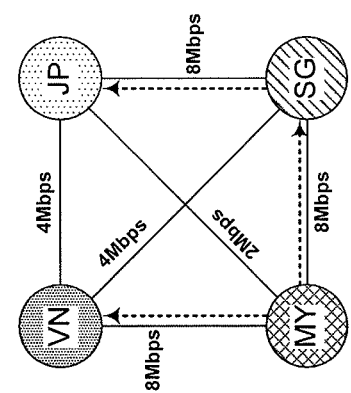
FIG. 2 shows a specific example of a conventional N-tree algorithm.
Figure 2C:
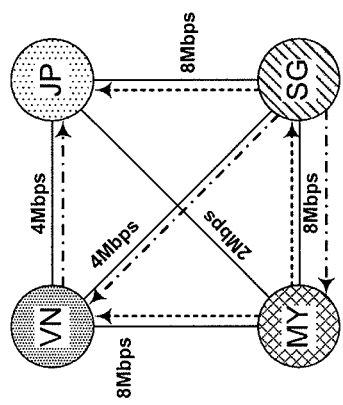
Figure 2B:
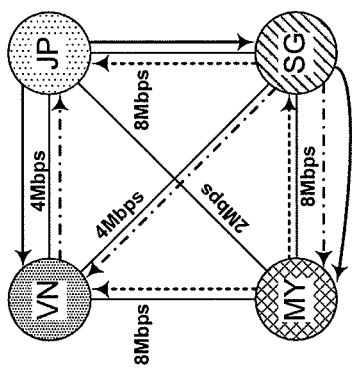
Figure 2A:
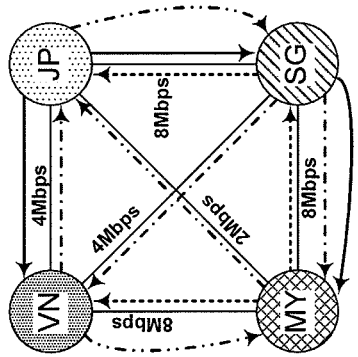

Note that, according to the water spread policy, a container that contains N water-source tunnels (i.e. holes) will spread water to different distances from its location, depending on the sizes and heights (i.e., pressures, which correspond to the heuristic rule database used upon selecting the branches) of the tunnels. A bigger tunnel spreads more water than a smaller tunnel. A tunnel that is closer to the bottom of the container spreads water further than a tunnel located higher. Tunnels may have varying capacities (i.e. hole sizes, which corresponds to the bandwidth). This is interpreted to mean that a node with a broader bandwidth should deliver more streams to a greater number of nodes in the N-tree, than a node with a narrower bandwidth. As for a specific example of "the height of a tunnel," in the case of FIG. 1 above, the height is given by: bandwidth×first coefficient+reciprocal of delay×second coefficient.

The algorithm has the following three main phases:

(i) Connection Establishment Phase: Connection is established between all nodes, and network metrics (i.e. node connection status) are collected.

(ii) N-tree Building Phase: The status of N-trees with mesh node connections is updated using a connection table, which is referred as an "optimal stream path information table." The status of join and leave of nodes in the ALM session is updated.

(iii) Control or N-tree Optimization Phase: Refinement procedures for gradual improvement of overall N-tree fair bandwidth allocation with minimal delay, are carried out. In this phase, nodes or links are moved between nodes or links for N-tree optimization, leading to ALM with fast route convergence ("FRC"). The metric information then is used to construct AV stream distribution routes for nodes. The metric information includes the bandwidth between client nodes, the latency/delay between client nodes, the IP addresses and port numbers of client nodes, the functions of client nodes in the ALM session including roots, the child-parent-grandparent relationships, the number of used and unused upload links and the number of used and unused download links.

If communication is performed between nodes A, B and C, the relationships of connections between nodes A, B and C can be calculated from the above metric information. For example, of there is connection between nodes A and B and there is no connection between nodes A and C, metric information measurements show that the bandwidth between nodes A and C is zero and the latency (round trip time or "RTT") between nodes A and C is infinite.

The metric information of the present invention is not given in discrete values (i.e. 0's and 1's) representing whether or not there is connection, but is given in continuous values representing full-mesh measurements (A-B, A-C and B-C, bidirectional). That is to say, there are cases where the metric between nodes A and C is 1 Mbps, 0.1 Mbps or 0 Mbps.

The N-tree algorithm is suitable for AV conference applications where a small group of participants exchange AV streams and so on with a high degree of interactivity and good AV quality, throughout sessions among all participants over the network.

With the present invention, the upload slot capacity and download slot capacity of each node are taken into considerations the N-tree algorithm of the present invention, in order to ensure bandwidth-fairness for all nodes. The upload slot and download slot indicate the uplink bandwidth capacity and downlink bandwidth capacity for each node. The bandwidth is divided into multiple discrete ranges (e.g. 64 kbs, 128 kbs, etc.).

The "water-spread" policy is adopted along with the above three main phases of the N-tree construction algorithm, for tree construction with fair bandwidth distribution. This solution achieves ALM_FRC (Application Layer Multicasting with Fast Route Convergence) with respect to all ALM nodes in a given AV session. The N-tree algorithm may be executed in a concentrated manner or in a distributed manner between ALM nodes.

Figure 3:
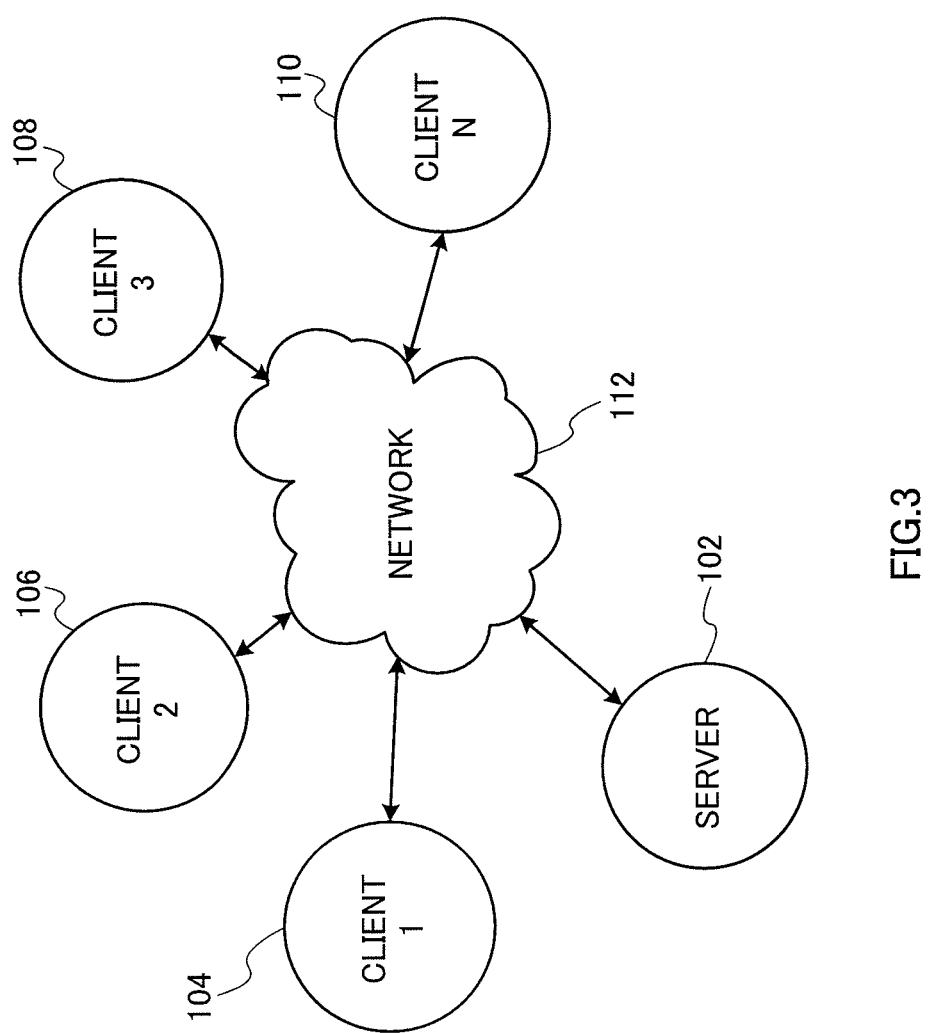
FIG. 3 shows a communication system according to an embodiment of the present invention.

FIG. 3 shows the communication system according to an embodiment of the present intention. As shown in FIG. 3 with the present embodiment, multiple nodes 104, 106, 108, 110 and a sever node 102 are each connected to a network 112. Multimedia applications such as AV conference applications provided in each client make it possible to exchange AV streams between the multiple client nodes during ALM sessions. The server node 102 is able to communicate with all other client nodes and exchange network information between these client nodes simultaneously.

Note that, with the present invention, the words "node" and "entity" both refer to a physical and logical network entity, and will be used interchangeably hereinafter. Both a client node (or a server node) and a client entity (or a server entity) may be interpreted with general definitions in network communication. Furthermore, a server node and a client entity both refer to a terminal apparatus in communication systems.

The server node 102 collects metric information from each client nodes at prescribed times (actively) or on a regular basis and execute the N-tree algorithm (i.e. water spread policy). Next, the server node 102 stores bandwidth-fair ALM route information, which is the result of the N-tree algorithm, in a forwarding table. Furthermore, the server node 102 is responsible for dynamically transmitting bandwidth-fair N-tree routing information, generated from the bandwidth-fair ALM route information stored in the forwarding table, to all the participating client nodes. The prescribed times may include times streams from above stop arriving.

Bandwidth-fair N-tree routing information received in the client nodes will be used in the client nodes to transfer received ALM packets to the next client nodes, until the final destination is reached.

Figure 4:
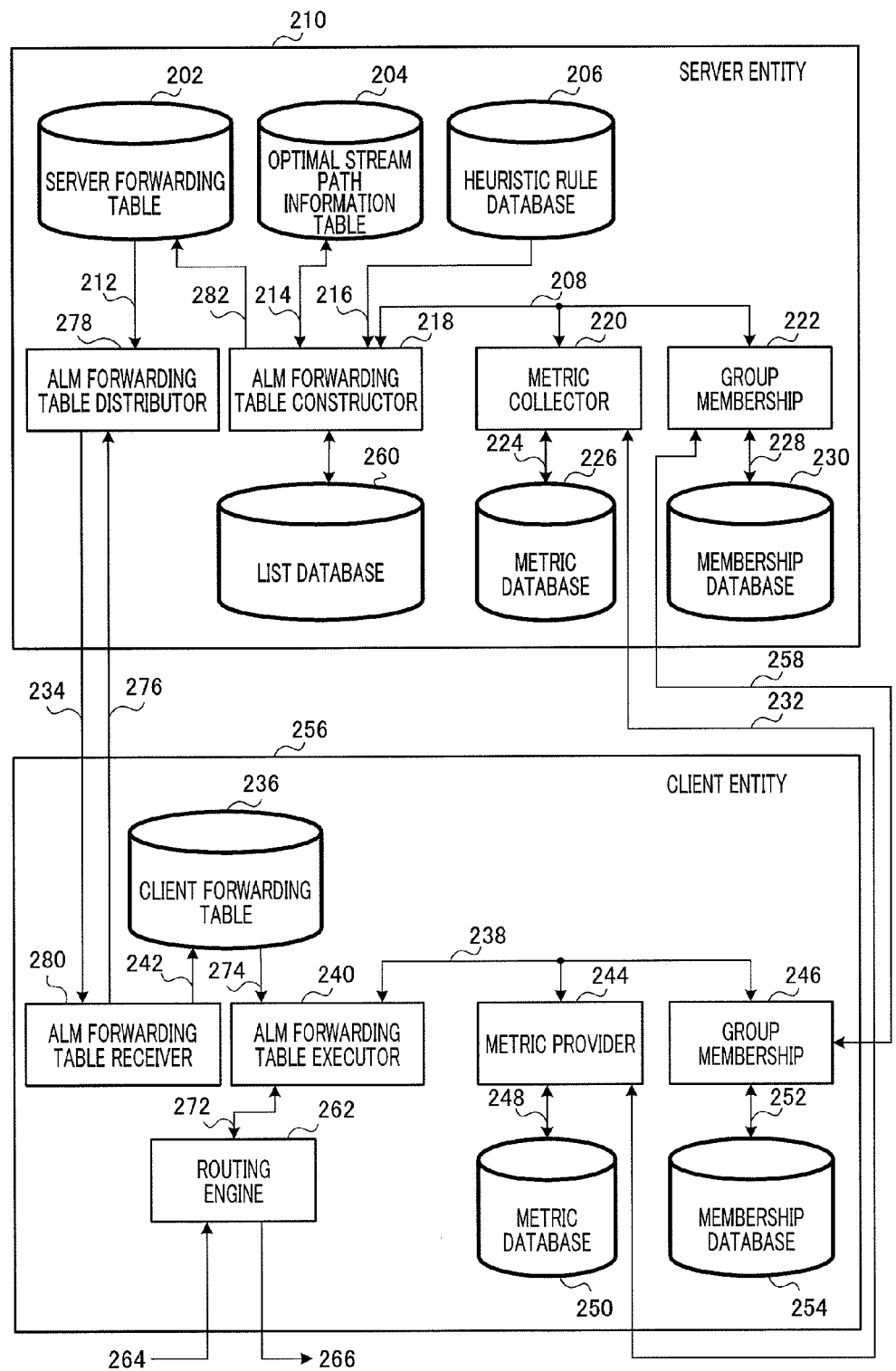
FIG. 4 is a block diagram showing internal configurations of a client entity and server entity according to an embodiment of the present invention.

FIG. 4 is a block diagram showing internal configurations of a client entity 256 and a server entity 210 according to an embodiment of the present invention.

An ALM session is defined as a logical session, where two or more client entities 256 are connected via a network in a multi-party application to exchange data packets between the clients simultaneously. An ALM session requires a server entity 210 for session coordination between the participants.

The client entity 256 is an ALM function, in a node participating in an ALM session, for network packet streaming between all nodes. The server entity 210 is an ALM function that is responsible collecting metric information and executing the N-tree algorithm leading to an ALM_FRC distribution tree. The client entity 256 and the server 210 are both logical entities that may reside in any node.

Only one server entity is required for a centralized N-tree session. In a distributed session, each node will have one server entity and one client entity. A case will be described below where an ALM session is carried out with multiple client entity functions and one server entity function (that is, centralized N-tree session approach).

Referring to FIG. 4, the server entity 210 has a metric collector 220, group membership 222, ALM forwarding table constructor 218 and ALM forwarding table distributor 278. The metric collector 220, group membership 222 and ALM forwarding table constructor 218 are connected with a link (208), in order to exchange metric information between them.

Figure 6:
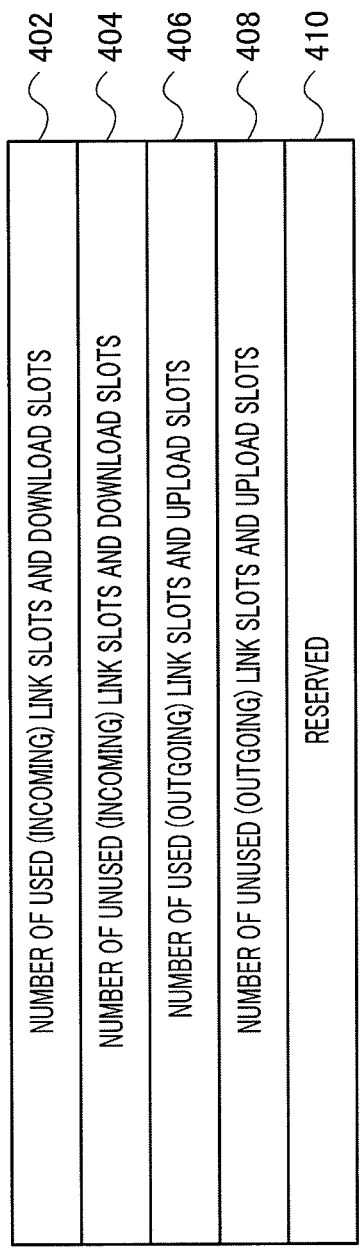
FIG. 6 shows the data structure of N-tree root node information in an OSPIT.
Figure 7:
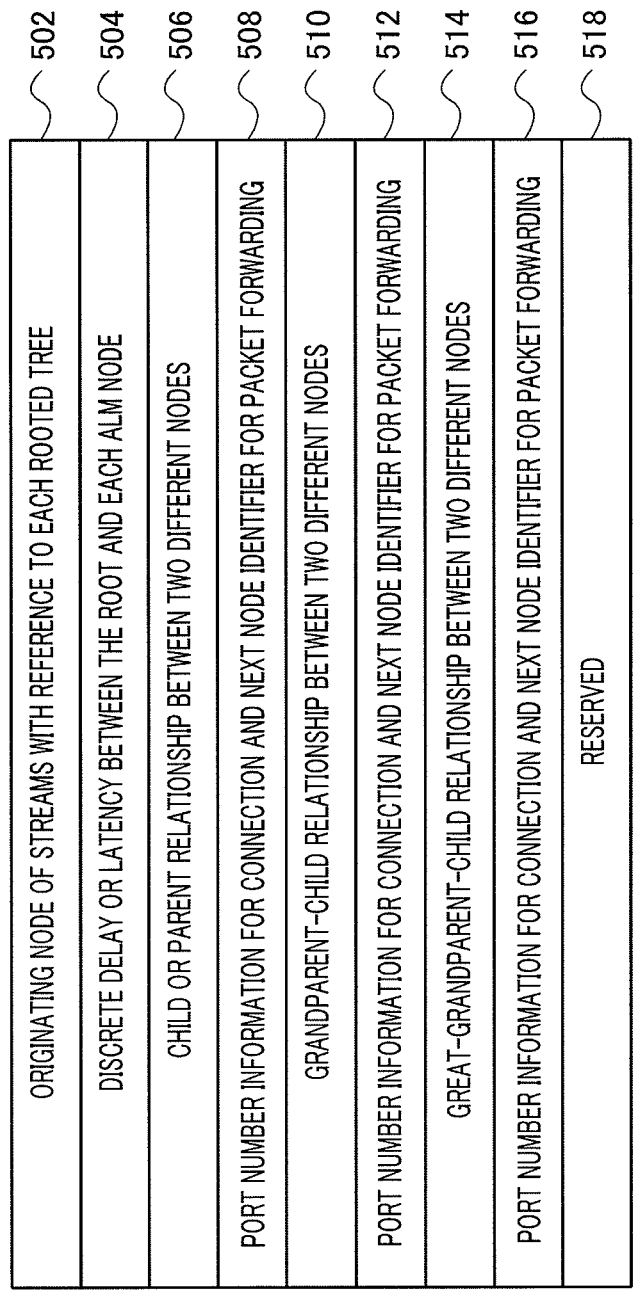
FIG. 7 shows the data structure of N-tree member node information in an OSPIT.

The metric collector 220 and group membership 222 in the server entity 210 collects data dynamically from all the client nodes 104, 106, 108, 110 in the ALM session. The metric information includes the bandwidth between the client nodes, the latency/delay between the client nodes, the IP addresses and port numbers of the client nodes, the functions of the client nodes in the ALM session including roots, the child-parent-grandparent relationships, the number of used and unused upload links and the number of used and unused download links. These metric information is stored in a metric database 226 and membership database 230 accessible via links 224 and 228. FIG. 6 and FIG. 7 illustrate information/content data structures in detail. The IP address of each client node is stored in the membership database 230.

A "root node" refers to a source node in the N-tree from which a network packet originates. Consequently, if all nodes transmit network packets to N members in the N-tree, there will be five route nodes. The child-parent-grandparent relationships refer to relationships between nodes in the N-tree. A child node refers to a node that receives network packets directly from its parent node, via the download slot of the parent node. The parent node transmits network packets directly to the child node via the upload slot of the child node. Meanwhile, a grant-parent node refers to a node that is connected via a parent node for a given child node, and a network packet is given from a grandparent node to a parent node before it reaches a child node. The relationship between a child node and a grandchild node is the same as the relationship between a grandparent node and a child node. The upload slot and download slot of a node represents the outgoing capacity and incoming capacity of the node respectively. A link slot refers to the bandwidth capacity of the link between two nodes with reference to the upload slot and download slot used in a specific ALM session.

An N-tree that is build for ALM_FRC shall abide by the upload/download slot requirement, link slot requirement and latency requirement, for a given ALM session.

Figure 5:
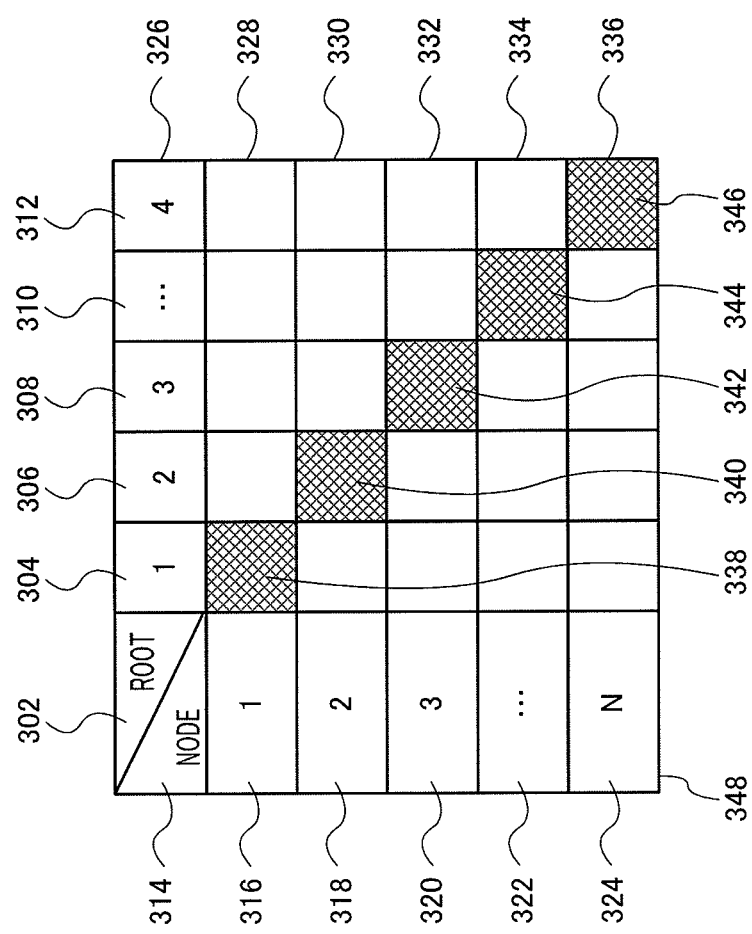
FIG. 5 shows an example of an optimal stream path information table.

The optimal stream path information table 204 contains information of N-tree session for all nodes in a connected state, described in FIG. 5, FIG. 6 and FIG. 7 (i.e. information related to tree status). The optimal stream path information table 204 contains the N-tree connection information. Meanwhile, the heuristic rule database 206 contains a set of heuristic rules that are used to construct a bandwidth-fair ALM N-tree. The basic and augmenting rules in the heuristic rule database 206 include the following:

The basic rule of the N-tree algorithm is to construct N-trees, one tree per node, for network packet distribution. This means that each node must receive N−1 streams with N−1 download slots. Each tree will add N−1 upload links to the total links that are used. Consequently, if there are N-trees, there will be at least a total of N×(N−1) upload links from all participants. Besides, some extra slots and links are required for control message data transmission.

Additional heuristic rules include the upload/download slot requirement, link slot requirement and latency requirement for a given session. The complexity of calculating an optimal N-tree meeting all of the above three requirements is NP difficult. Thus, to build the best and optimal N-tree, violating some of the above requirements would be acceptable. For example, violation of the latency requirement will cause delay in receiving streams, and violation of the upload requirement or link the requirement will disable part of the stream distribution. The heuristic approach would be to fulfill the upload or download requirement and the link requirement first and then fulfill the link latency requirement. By applying the above rules, requirements, N-trees will be built with acceptable latency.

The heuristic rules database 206 may also contain multiple heuristic rules that can be applied to N-tree construction, including:

Rule 1: A node should first use its bandwidth to upload its streams, rather than carry streams of other nodes so that the latency in its tree is reduced.

Rule 2: If a selection is to be made between nodes, choose the node which has the greatest number of slots left.

Rule 3: If a selection is to be made between links, choose the link which has the largest slot capacity left.

Rule 4: If, in rule 3, there are links having the same slot capacity left, choose link which yields the smallest end-to-end latency for the tree.

Figure 8:
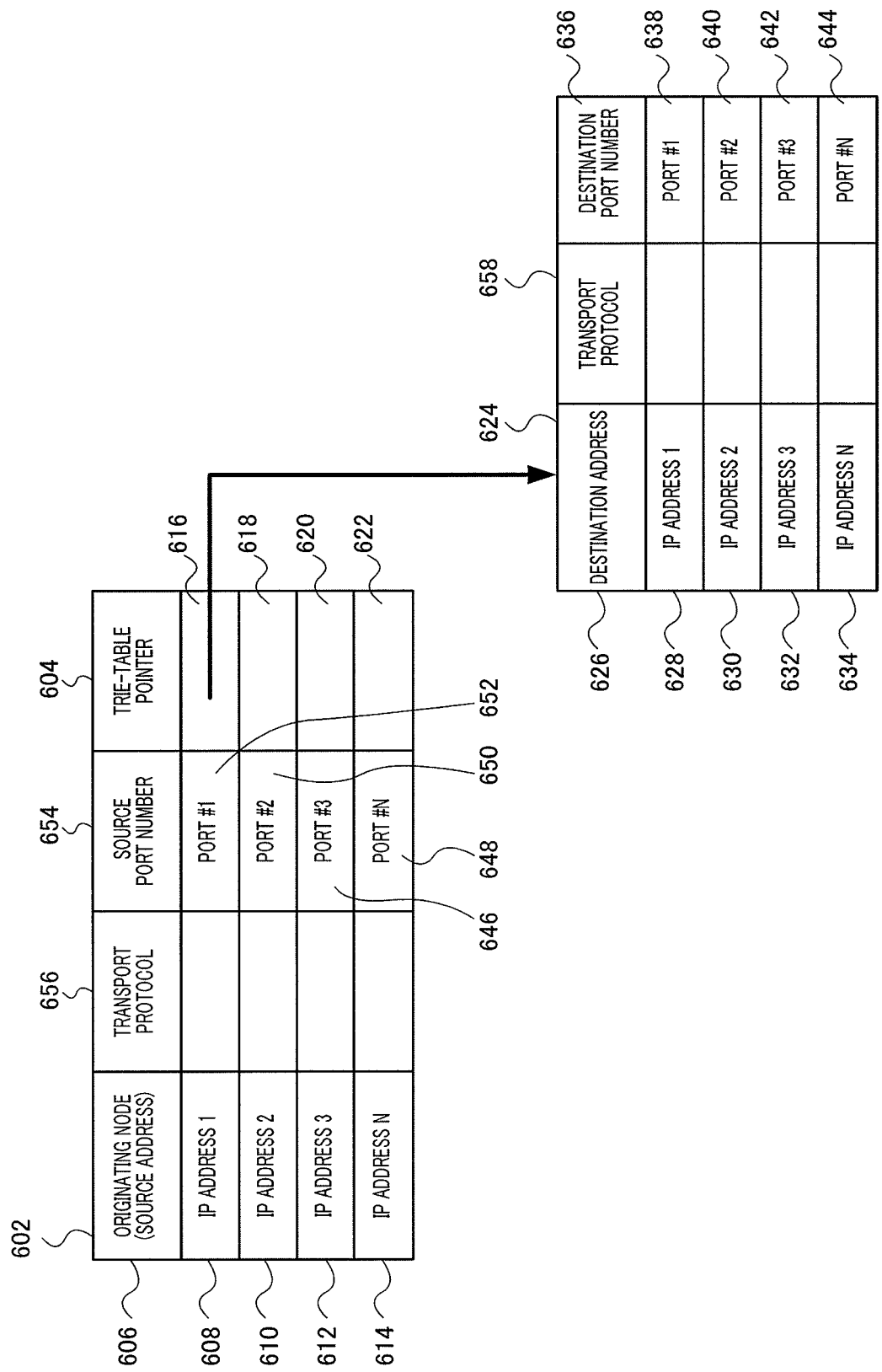
FIG. 8 shows a bandwidth-fair forwarding table.

The server forwarding table 202 stores bandwidth-fair ALM route information, which is packet forwarding information for all nodes in a specific N-tree session, as illustrated in FIG. 8.

The ALM forwarding table constructor 218 accesses metric information collected by the metric collector 220 and the group membership 222. Furthermore, the ALM forwarding table constructor 218, adopts the heuristic rules stored in the heuristic rule database 206 to dynamically and continuously form and update N-tree session information stored in the optimal stream route information table 204. Incidentally, the ALM forwarding table constructor 218 is a main module in the server entity 210.

Next, the ALM forwarding table constructor 218 executes the N-tree algorithm (i.e. water spread policy). Next, the ALM forwarding table constructor 218 stores bandwidth-fair ALM route information, which is the result of the N-tree algorithm, in the server forwarding table 202, via the link 282. The bandwidth-fair ALM route information is given in the form of a forwarding table.

The ALM forwarding table constructor 218 accesses the heuristic rule database 206, optimal stream path information table 204, server forwarding table 202, metric collector 220 and group membership 222, via links 216, 214 and 208. During N-tree algorithm execution, the ALM forwarding table constructor 218 uses the "initial list," "ordered list," "rule-based ordered list," and "rule-based pair list" in the list database 260, for bandwidth-fair N-tree construction.

Figure 15A:
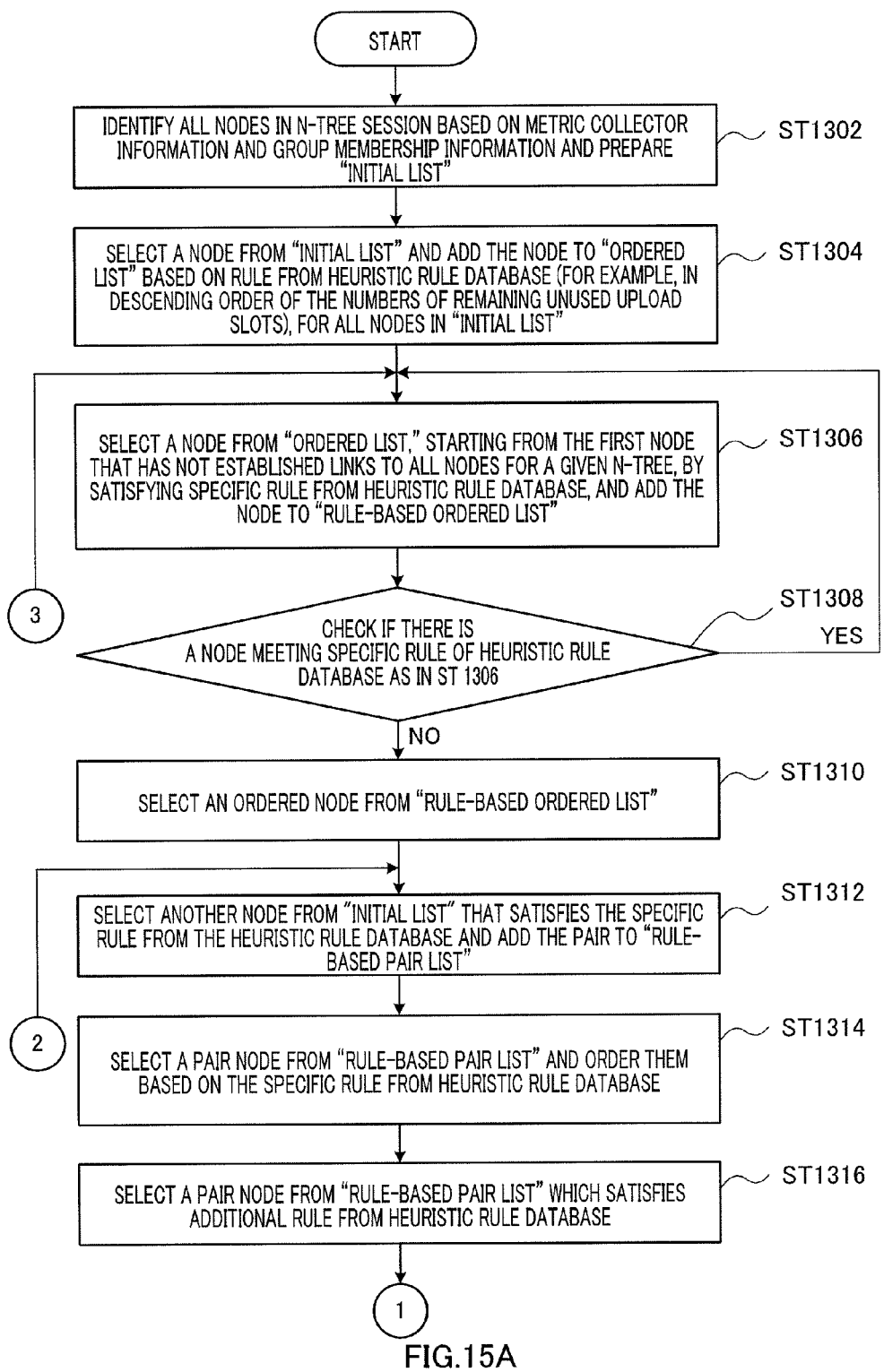
FIG. 15A shows the details of steps in N-tree algorithm execution.
Figure 15B:
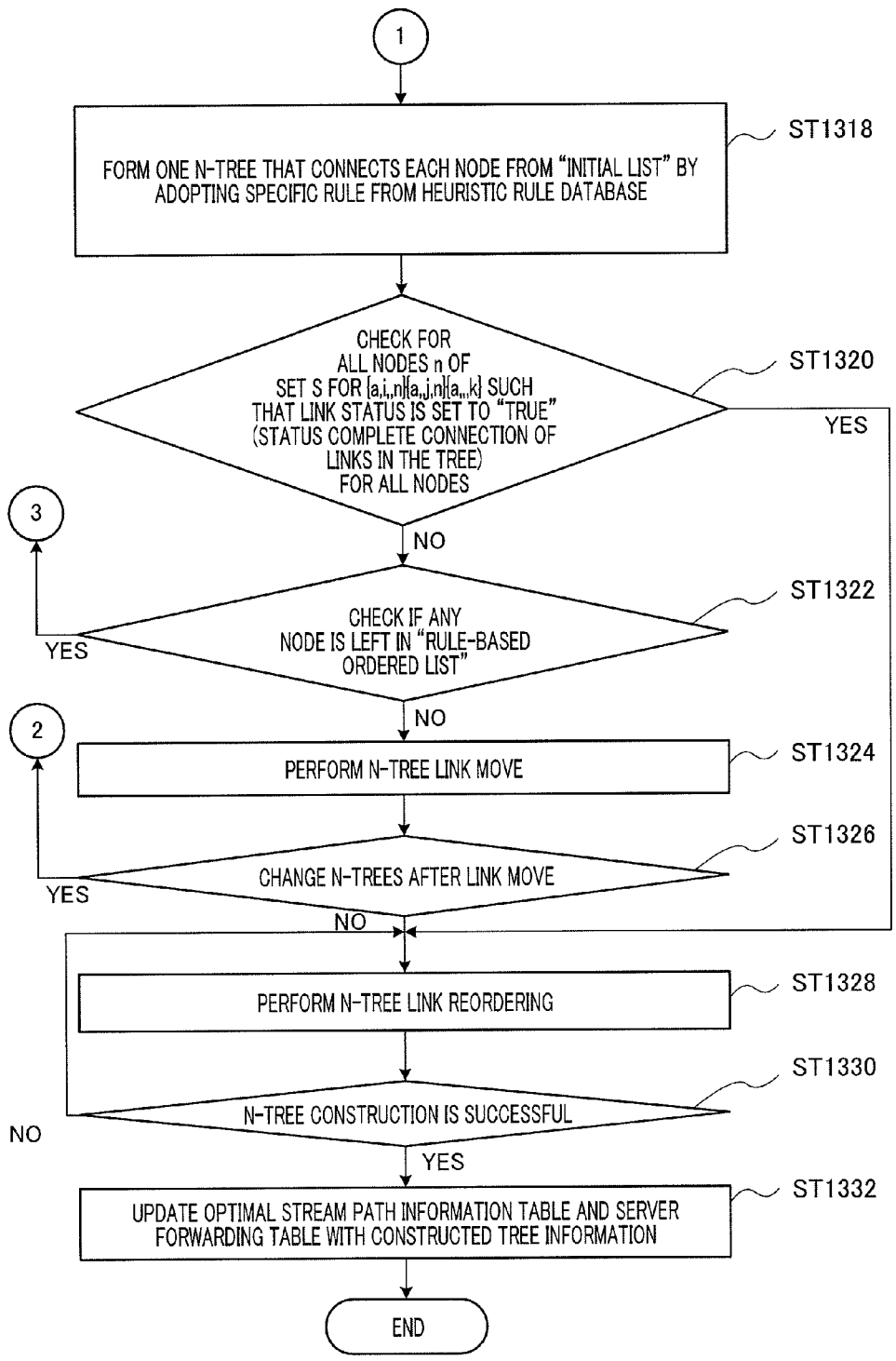
FIG. 15B shows the details of steps in N-tree algorithm execution.

The "initial list" contains information about all members in the ALM session, which is collected by the group membership 220 and metric collector 222. The "ordered List" provides a list of members sorted based on specific rules (e.g. upload and/or download slot capacity). The "rule-based ordered list" provides an ordered list of members based on specific rules (e.g. link latency between two nodes). The "rule-based pair list" provides a list of members forming a link between two nodes based on specific rules (e.g. selected heuristic rules). The usage of these lists is shown in FIG. 15 and FIG. 16 as part of N-tree algorithm description.

The ALM forwarding table distributor 278 inputs bandwidth-fair ALM route information stored in the server forwarding table 202 via a link 212. Next, from this information, the ALM forwarding table distributor 278 generates bandwidth-fair N-tree routing information for each client entity 256 in the N-tree. The bandwidth-fair N-tree routing information includes the combination of the incoming port number, destination address and destination port number. The ALM forwarding table distributor 278 transmits bandwidth-fair N-tree routing information to each client entity 256 via a network link 234.

The client entity 256, which generally refers to at least two nodes in the ALM network, is connected with the server entity 210 via network links 234 and 276, and is able to communicate dynamically with the server entity 210. The client entity 256 has three main modules, namely an ALM forwarding table receiver 280, metric provider 244, group membership 246 and ALM forwarding table executor 240.

The ALM forwarding table receiver 280 receives bandwidth-fair N-tree routing information from ALM forwarding table distributor 278 via the network link 234. Next, the ALM forwarding table receiver 280 stores the information in a client forwarding table for packet routing 236 via a link 242.

The metric provider 244 and group membership 246 are responsible for collecting data dynamically from all client nodes 104, 106, 108 and 110 in the ALM session. The metric information includes the bandwidth between the client nodes, the latency/delay between the client nodes, the IP addresses and port numbers of the client nodes, the functions of the client nodes in the ALM session including roots, the child-parent-grandparent relationships, the number of used and unused upload links and the number of used and unused download links.

The metric information is stored in a metric database 250 and membership database 254 accessible via links 248 and 252.

The metric information is distributed to the metric collector 220 and group membership 222 of the server entity 210, dynamically and periodically, by the metric provider 244 and group membership 246. The information is distributed via network links 232 and 258 accordingly.

The metric information is then used to update the metric database 226 and membership database 230 of the server entity 210. The ALM forwarding table executor 240 accesses the metric provider 244 and group membership 246 via a link 238 for local metric data exchange. The metric provider 244 and metric database 250 are connected via a link 248 and the group membership 246 and membership database 254 are connected via a link 252.

The ALM forwarding table receiver 280 is responsible for dynamically and periodically receiving bandwidth-fair routing information from the server entity 210 and updating the local client forwarding table 236 with the received information. Furthermore, the ALM forwarding table receiver 280 is able to request individual routing information from the ALM forwarding distributor 278 via a link 276.

The bandwidth-fair N-tree routing information in the client forwarding table 236 is used in the ALM forwarding table executor 240 dynamically in order to process ALM packets received from other client entities 106, 108 and 110. Afterwards, the bandwidth-fair N-tree routing information is forwarded to the next destination identified by the routing engine 262. The ALM forwarding table executor 240 takes out information about the next destination from the client forwarding table 236 via a link 274, and provides this information to the routing information 262 via a link 272. The routing engine 262 implements the search function for each network packet in ALM in each client entity for all incoming packets 264 in the application layer. The received packets 264 are looked up in the routing engine 262 based on the source address 606, source port number 654 and the transport layer protocol, and then modified and forwarded to the designated destination node as transmission packets 266. These steps will be described in detail with reference to FIG. 8 and pertaining descriptions.

Communication between the ALM forwarding table distributor 278 and the ALM forwarding table receiver 280 via links 276 and 234 is carried out using a specific message structure. The forwarding table content 808 shown in FIG. 10 including bandwidth-fair forwarding table information, is included in the forwarding table entry (FTE) shown in FIG. 9. Information of one or multiple forwarding table entries (FTEs) is combined and transmitted from the server entity 210 to each client entity as a forwarding table (FT) message via a link 234.

Next, the configuration of the optimal stream path information table 204 will be described in detail with reference to FIG. 5.

The entries of "ROOT" 302 in the rows 326 show the numbers of root nodes in the N-tree. A root node is a source nodes from which ALM application packets are originated in the N-tree. These packets are destined to all ALM receivers in the ALM session. For the root 302, there may be multiple root nodes as indicated by the reference codes 304, 306, 308, 310 and 312. Rows 328, 330, 332, 334 and 336 are the entries for keeping each participating node information for a given N-tree rooted at specific root nodes 304, 306, 308, 310 and 312.

The entries of nodes 314 in the columns 348 keep the identity of each node 316, 318, 320, 322 and 324 in the ALM N-tree session. Thus, if there are N nodes in a specific N-tree, there will be N entries in the rows 314. Similarly, if the N nodes are all root nodes that create source packets, the rows 302 will have N columns in the table.

The table entries with reference codes 338, 340, 342, 344, 346 save information related to root nodes such as illustrated in FIG. 6. On the other hand, all the other table entries besides the entries of the reference codes 338, 340, 342, 344, 346 save node specific information for a specific N-tree such as illustrated in FIG. 7. The optimal stream path information table 204 may be a static or dynamic table which can grow bigger or shrink smaller to accommodate the growth of participating nodes in the ALM N-tree session.

FIG. 6 illustrates the data structure of N-tree root node information as expressly shown in the optimal stream path information table 204, metric databases 226 and 250 and membership databases 230 and 254 for all trees in the ALM session. A field 402 shows the number of used incoming link slots and download slots, for specific node in the entire N-tree session.

Meanwhile, a field 404 shows the number of unused incoming link slots and download slots for a specific node in the entire N-tree session. Similarly, a field 406 shows the number of used outgoing link slots and upload slots, while a field 408 shows the number of unused outgoing link slots and upload slots for a specific node in the entire N-tree session. Meanwhile, a field 408 shows the number of unused incoming link slots and download slots for a specific node. The field 410 is reserved.

FIG. 7 illustrates information data structure for nodes other than the root nodes for a specific tree in the ALM session. A field 502 shows the originating node of streams with reference to each rooted tree. A field 504 shows the discrete delay or latency between the root and each node. A field 506 represents the child or parent relationships between two different nodes and hence suggests the presence of these functions. This is followed by a field 508 showing port number information for connection and next node information or identifier such as IP address for packet forwarding. This field also indicates that the next node exists.

This field is therefore a leaf node for packet forwarding (i.e. terminal node where forwarding ceases). Similarly, consecutive fields 510, 512, 514 and 516 represent grandparent (two generations back)—child and great-grandparent (three generations back)—child (one generation later) relationships. Even though, only three levels are shown with the present information, the present invention is by no means limited to this and more levels can be defined for a broader range of usage. Finally, a field 518 represents a reserved field.

FIG. 8 illustrates generic formats of bandwidth-fair forwarding tables 602 of both the server forwarding table 202 and client forwarding table 236 used in the server entity 210 and client entity 256. The first level in the table 602 includes the following three columns, that is, the originating node/source address 606, source port number 654 and trie table pointer 604. The originating node (source address) 606 stores the IP addresses of the nodes 608, 610, 612 and 614. The source port number 654 stores the source port numbers 654 of all originating nodes 646, 648, 650 and 652. The trie table pointer 604 saves the pointers 616, 618, 620, 622 for the next level forwarding table 624.

Multiple entries of the originating nodes 606 can each exist with the next level forwarding table 624. The next level forwarding table contains the destination/forwarding node IP address 626 and destination port number information 636. In the next level forwarding table 624, there may b multiple IP addresses 628, 630, 632 and 634 and port numbers 638, 640, 642 and 644 specifying where amongst the nodes the received packets need to be forwarded. Furthermore, both tables 602 and 624 have transport fields 656 and 658 showing the type of the transport protocol for a specific stream.

Figure 9:
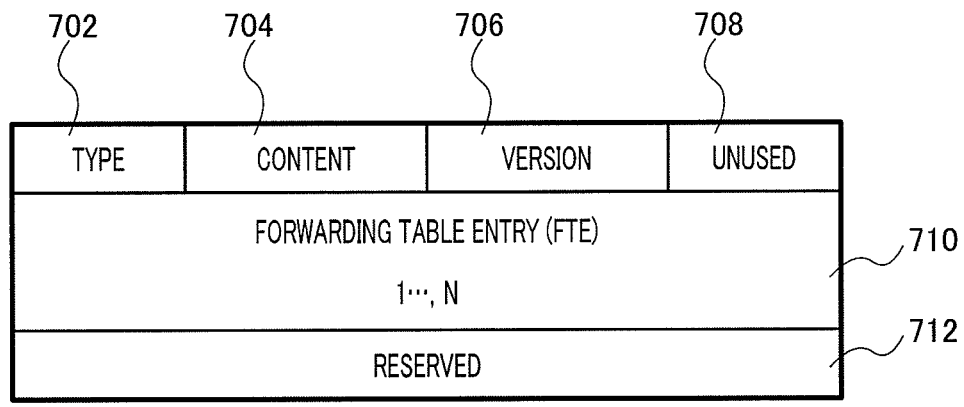
FIG. 9 shows a forwarding table ("FT") message structure.

The forwarding table information is exchanged between the server entity 210 and client entity 256 by using the forwarding table message (FT) shown in FIG. 9. Search for network packet forwarding in the N-tree at each node is done using the IP address, port number and transport protocol (e.g. UDP or TCP). The routing engine 262 implements the search function for each network packet in ALM in each client entity for all incoming packets 264 in the application layer.

The forwarding table 602 is used in the client entity to perform a search for the intended destination IP address 626 and so forth on a per incoming packet basis, and then forwarded to the node designated for the next in the N-tree. The routing engine 262 also changes the source IP address and port number of the network packet during the forwarding phase before transmission packets 266 are forwarded. This function is critical to ensure streaming path adherence as constructed by the N-tree algorithm.

In usual unicast applications, the source IP address and port number of a network packet are not changed. The packet transfer is performed according to an overlay tree without fair bandwidth allocation. However, one of the features of the present invention is that the source IP address and destination port are changed by the forwarding node so as to follow the bandwidth-fair N-tree path to achieve ALM_FRC.

FIG. 9 shows a FT message format with a total of six fields. The type field 702 identifies between the request message type and the response message type. The content field 704 indicates content to identify between a full forwarding table entry (FTE) update or and a partial forwarding table entry (FTE) update from the server entity. The version field 706 shows the version of the ALM and N-tree algorithm. The unused field 708 indicates that the filed is currently not in use. The FTE field 710 contains a single or multiple forwarding table entry (FTE) messages. The FT message ends with the reserved field 712.

Figure 10:
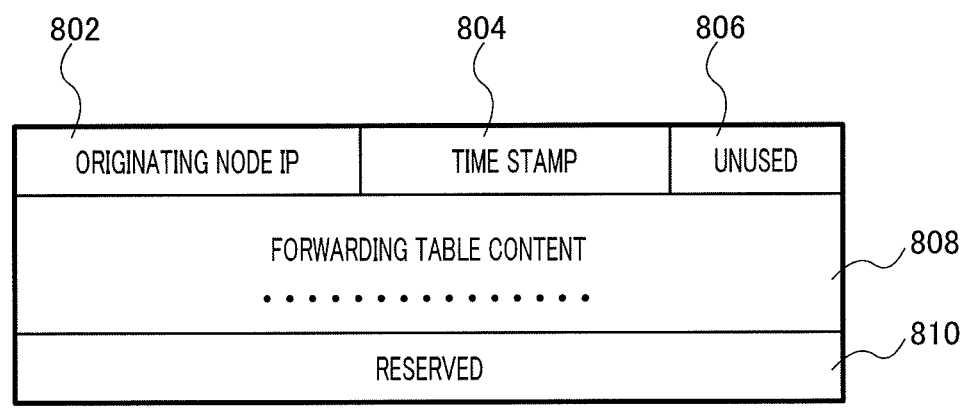
FIG. 10 shows a forwarding table entry ("FTE") message structure.

FIG. 10 shows a structure of forwarding tale entry (FTE) message 710 with five fields. The originating node IP field 802 shows the IP address of the node that sent the FT message. The time stamp field 804 is used to show the time the FT message was generated. The unused field 806 and the reserved field 810 (one that is planned to be used) show that these are not currently in use. The time stamp field 804 is used to show the time the FT message was generated.

The time stamp filed 804 assures that only the latest message is used in the client entity to update the routing table for the N-tree. If the transport protocol has its own time-stamp field, the time stamp field 804 is not used. However, if the transport protocol does not have a time stamp field, the time stamp field 804 is not necessary.

This is followed by a forwarding table content field 808, which contains bandwidth-fair forwarding table information for all client entities from the server entity. Forwarding table entry information selected from the server entity 210 is combined together and forms the FT message to be sent to each client entity 256. When the server forwarding table 202 is updated, an FT message, which contains a single FTE message or multiple FTE messages, is sent dynamically by ALM forwarding table distributor 278 to the influenced client entities.

Figure 11:
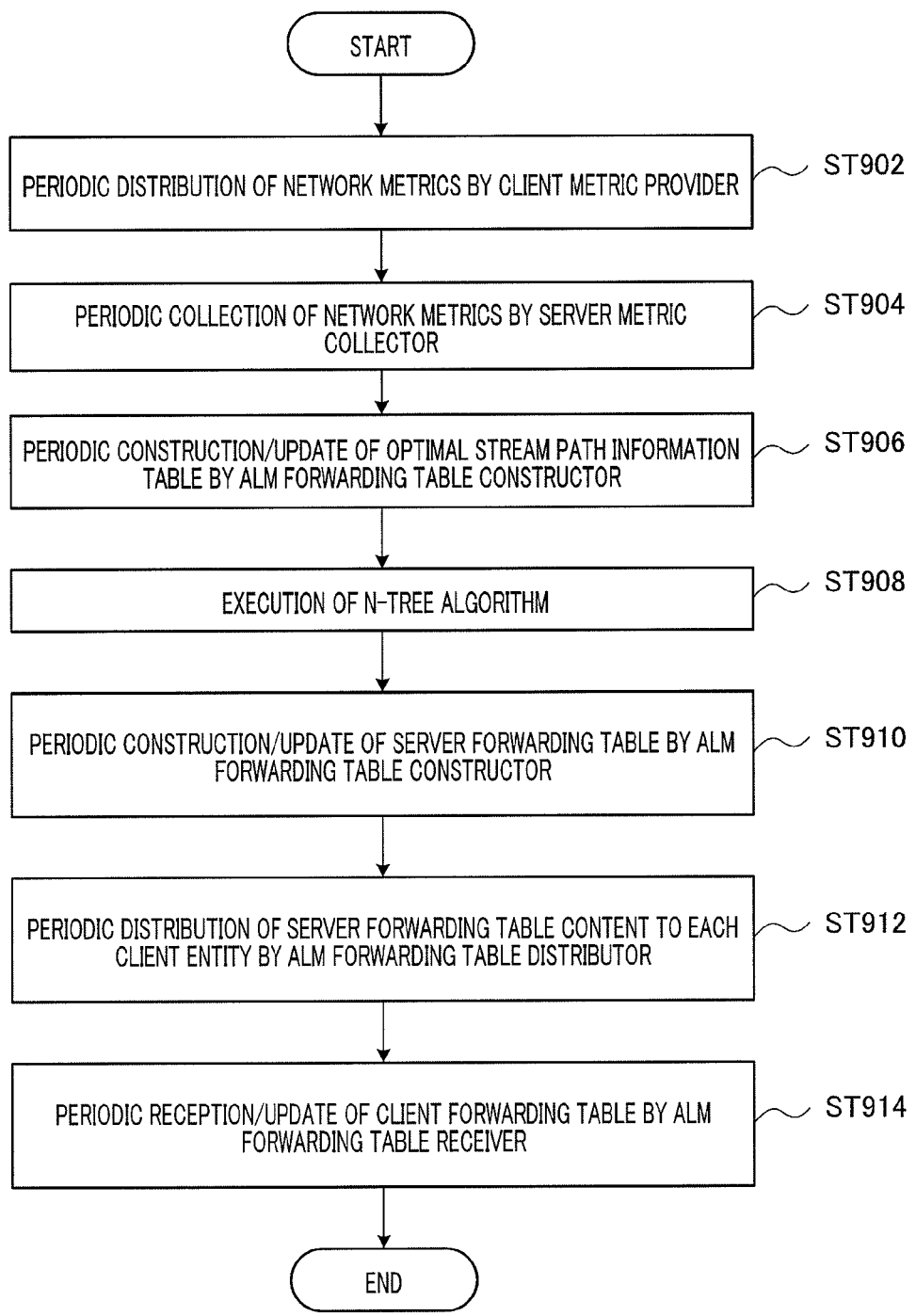
FIG. 11 shows an overall flow of an N-tree algorithm with ALM_FRC mechanism.

The overall mechanism for achieving ALM_FRC by performing fair bandwidth sharing in the N-tree, will be explained using FIG. 11.

Initially, the metric provider 244 and group membership 246 of the client entity 256 periodically distribute metric information (ST 902). Metric information that is sent periodically is collected by both the metric collector 220 and the group membership 222 (ST 904).

Next, when new metric information arrives, the ALM forwarding table constructor 218 accesses the metric database 226 via the metric collector 220 and accesses the membership database 230 via the group membership 222. The new metric information is used by the ALM forwarding table constructor 218 to update the optimal stream path information table 204 (ST 906).

Figure 13:
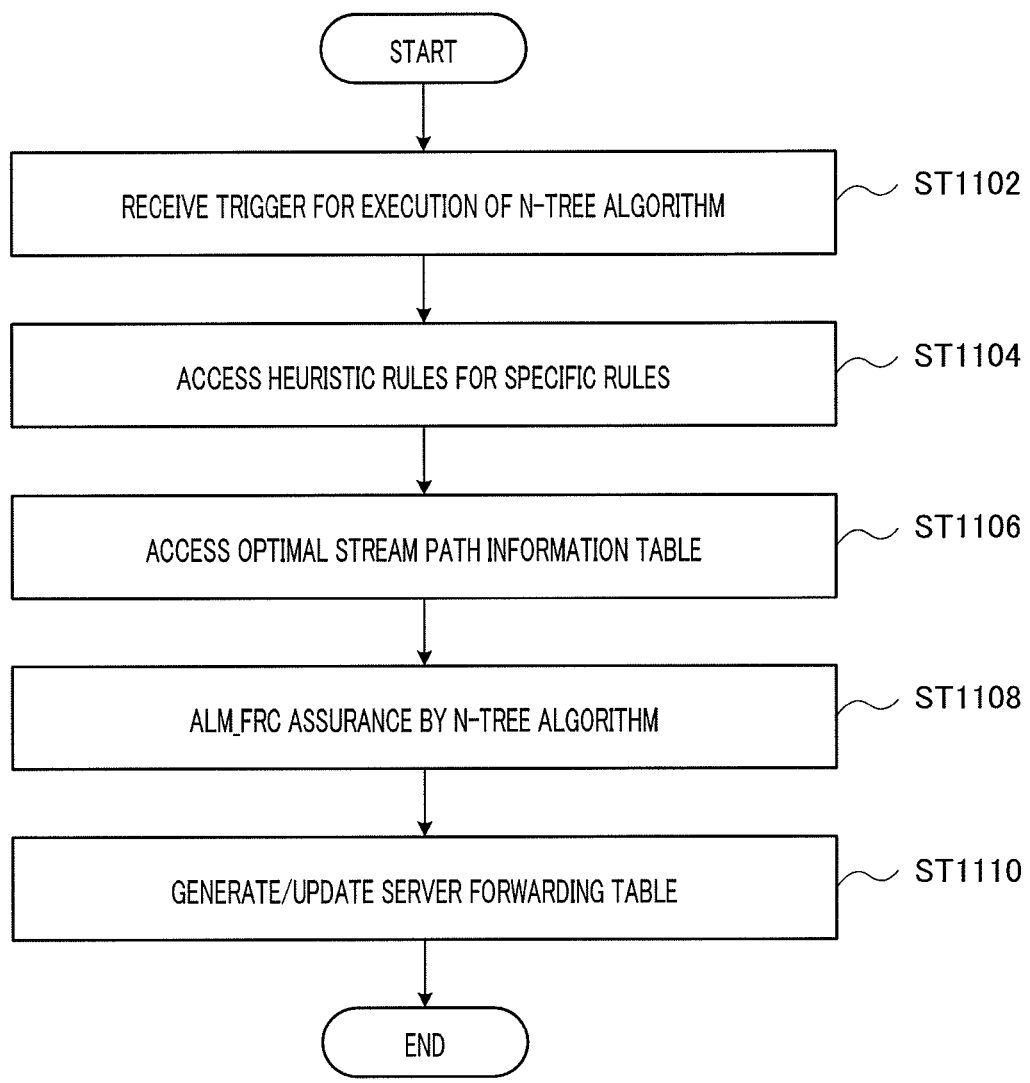
FIG. 13 shows a method of N-tree algorithm execution.

Next the ALM forwarding table constructor 218 executes the N-tree algorithm (ST 908). The ALM forwarding table constructor 218 executes the N-tree algorithm periodically and thereby updates the optimal stream path information table 204 and server forwarding table 202 (ST 910). FIG. 13 illustrates the steps of N-tree algorithm execution and this will be explained in later paragraphs.

Next, the content of the updated server forwarding table 202 is sent from the ALM forwarding table distributor 278 of the server entity 210 to each client entity 256 (ST 912). The ALM forwarding table receiver 280 updates the client forwarding table 236 with the forwarding table (FT) message received (ST 914).

Figure 12:
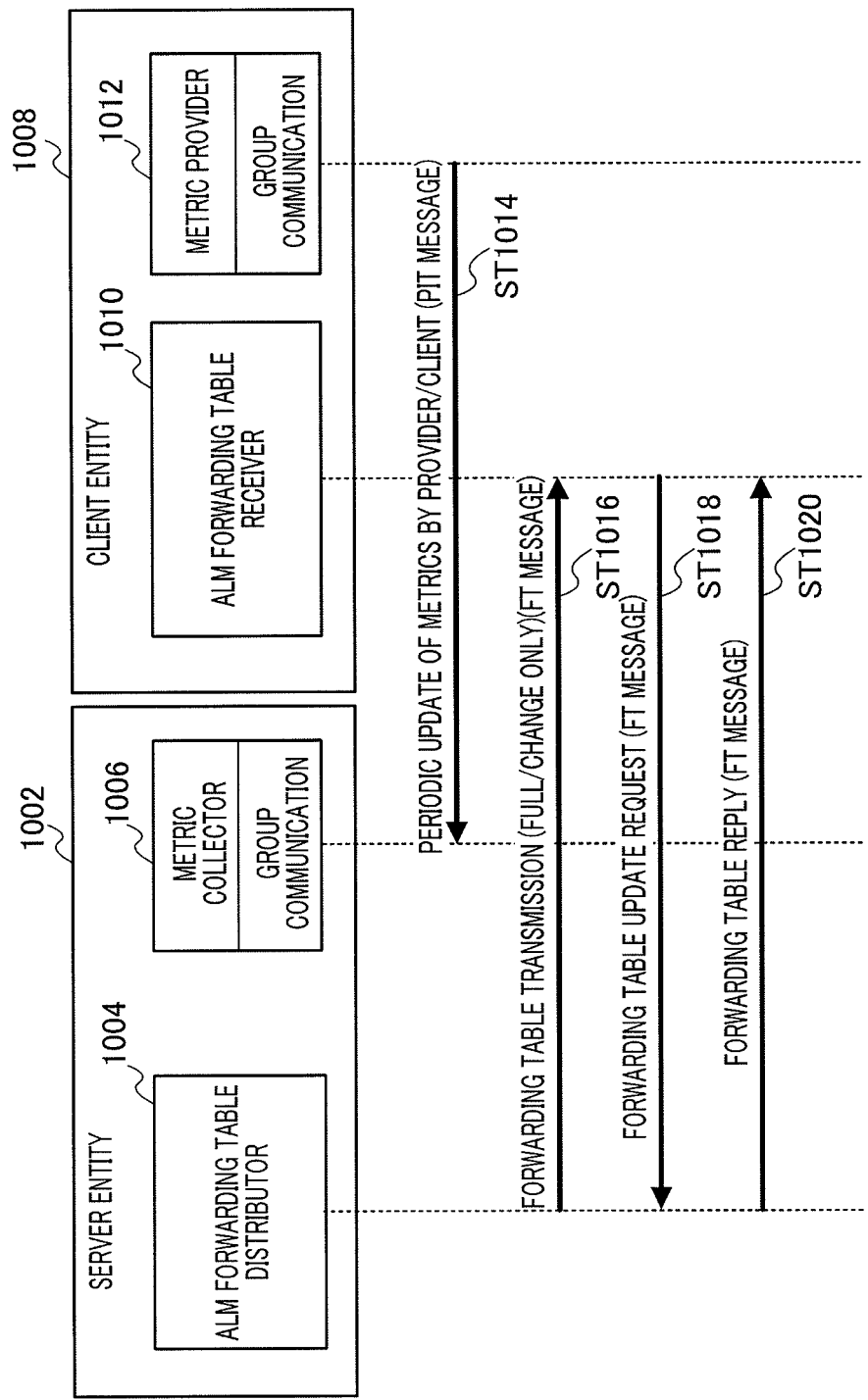
FIG. 12 shows a FT message exchange sequence.

Next, the forwarding table (FT) message exchange sequence will be described using FIG. 12.

Metric information is updated (PIT message) periodically (ST 1014). That is to say, metric information continues being updated between the metric provider 1012 of the client entity 1008 and the metric collector 1006 of the server entity 1002.

The ALM forwarding table distributor 1004 of the server entity 1002 forwards a forwarding table (FT) message including the forwarding table content, to the ALM forwarding table receiver 1010 of the client entity 1008 (ST 1016). Alternatively, the ALM forwarding table receiver 1010 is able to issue an update request for the client forwarding table 236 using the forwarding table (FT) message (ST 1018). In response to this request, the ALM forwarding table distributor 1004 forwards a forwarding table (FT) message including the forwarding table content, to the ALM forwarding table receiver 1010 (ST 1020).

Next, the method of N-tree algorithm execution in ST 908 shown in FIG. 11 will be described using FIG. 13. The initial trigger for N-tree algorithm invocation is provided from the ALM forwarding table constructor 218 (ST 1102). Next, access for a specific rule in heuristic rule database 206 is done by the ALM forwarding table constructor 218 (ST 1104). Next, access for the optimal stream path information table 204 is done by the ALM forwarding table constructor 218 (ST 1106). Afterwards, the ALM_FRC assurance by the N-tree algorithm is applied to metrics (ST 1108). Then, the ALM forwarding table constructor 218 updates the server forwarding table 202 with the resulting, manipulated metrics (ST 1110).

Figure 14:
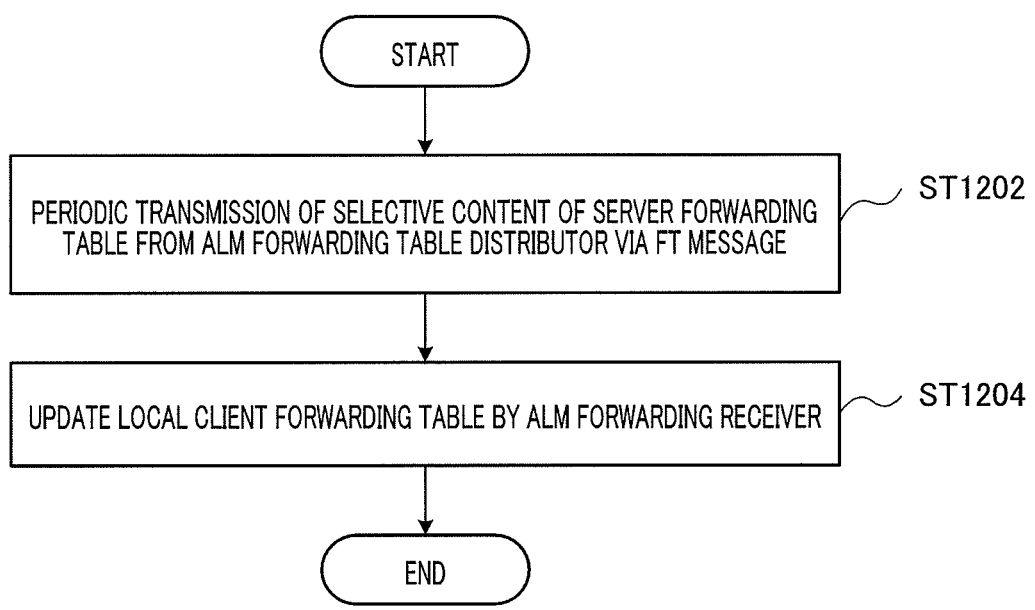
FIG. 14 shows a method for receiving and updating a bandwidth-fair forwarding table in client nodes.

The periodic forwarding table information reception and packet forwarding method by the client entity will be described using FIG. 14. The ALM forwarding table distributor 278 periodically transmits the selected content of the server forwarding table 202 to a specific client via forwarding table (FT) messages (ST 1202). The ALM forwarding table receive 280 of the client entity 256 will receive these forwarding table (FT) messages and update the client forwarding table 236 (ST 1204).

Next, the steps of N-tree algorithm execution adopting the "water spread" policy, will be explained in detail using FIG. 15. The whole process can be simply expressed as spreading water from each source node (i.e. root node) in the N-tree to all nodes in the ALM session until all source nodes are connected to each other and form N-trees. For example, each node in the ALM session $\{a, \ldots, n\}$ from the "initial list" is encoded with a specific color (to specify the transmission source node uniquely), and all links belonging to the tree with the root node "j" have color j. Initially, each node j contains a color set $S[j]=\{j\}$ showing stream connection or reachable status. When a stream k "flows" and reaches a node j, the node j will add the color k to its color set S: $S[j]=S[j]+\{k\}$.

Initially, for each color k, DONE $\{a, (k=False), \ldots, n\}$ is set to "False." When a stream k reaches all other nodes in the ALM session (the tree rooted at k is completed), add k to the DONE list such that DONE $\{a,(k=True), \ldots, n\}$ is set to True. One link is added in one loop, iteratively, to the trees by using those steps, until the N-trees are all complete such that all members in the DONE $\{a, \ldots, n\}$ set is set to "True."

First, the ALM forwarding table constructor 218 identifies all members in the N-tree session based on metric collector 220 information and group membership 222 information, and make the "initial list" in a list database 260 (ST 1302). Next, the ALM forwarding table constructor 218 selects a member from the "initial list" and adds the member to an "ordered list" in the list database 260 based on rules from the heuristic rule database 206, for all nodes in the "initial list" of all N-tree nodes (ST 1304). The rule from the heuristic rule database 206 is, for example, descending order of the numbers of remaining unused upload slots.

In accordance with the "water spread" policy example, in ST 1304, the ALM forwarding table constructor 218 selects nodes with the highest number of slots left that still have color k in the set S with DONE $\{a, (k=False), \ldots, n\}$. Those nodes will be added to the "ordered list". The node with the next highest number of slots left and satisfying the heuristic rule database rules for the upload/download slot requirements, is selected, iteratively.

Next, the ALM forwarding table constructor 218 selects a node from the "ordered list," starting from the first node that has not established links to all nodes of a given N-Tree, by satisfying the specific rule from the heuristic rule database 206. Next, the ALM forwarding table constructor 218 adds the node (for example, the node with the highest number of unused slots) (ST 1306). The above step is repeated for all nodes meeting the rule in ST 1306 until all nodes are ordered (ST 1308).

Next, the ALM forwarding table constructor 218 selects an ordered node from a "rule-based ordered list" for formation of a node pair (ST 1310). Another node from the "initial list" that satisfies the specific rule from the heuristic rule database 206 (e.g. minimum latency between two nodes) will be selected, and the pair node will be added to a "rule-based pair list" (ST 1312).

Next, the ALM forwarding table constructor 218 selects a pair of nodes from the "rule-based pair list" and order them based on a specific rule from the heuristic rule database 206 (ST 1314). The specific rule may be, for example, that the pair matches based on the link information associated with the highest number in the ordered list of unused upload slots. Selection of link for the formation of N-trees is thus performed through these steps (ST 1306 to ST 1314).

In accordance with the "water spread" example, in these steps (ST 1306 to ST 1314), the ALM forwarding table constructor 218 chooses an adequate tunnel through which water can spread (i.e. path establishing logical connections between nodes). An adequate tunnel (p1, p2) is a tunnel where some streams have already flown to the start point p1 but have not reached p2. Bigger tunnels or slots of higher numbers are preferable.

For all links (p, q) that have p member of "ordered list" in the previous step, all links (i, j) which satisfy the latency requirement and the cardinality of sets S[i] and $S[j] \neq \phi$ are selected. Next, the ALM forwarding table constructor 218 adds these to the "rule-based ordered list" (ST 1306). In the following step, the ALM forwarding table constructor 218 selects the highest slots from the "rule-based ordered list" and adds them to the "rule-based pair list" in the list database 260 (ST 1312).

Next, the ALM forwarding table constructor 218 from the "rule-based pair list" which satisfies an additional rule from the heuristic rule database 206 (e.g. smallest latency between the pair) (ST 1316). Next, the ALM forwarding table constructor 218 forms an N-tree that connects the nodes from the "initial list" by adopting specific rules from the heuristic rule database 206 (ST 1318). The specific rules may employ the rule that a plurality of node pairs establishing connection from one node in the N-tree to all the other nodes in the initial list, without violating the maximum latency rule, are selected. This process is repeated for all members from the "rule-based pair list" by checking all nodes, n and members of set S for {a,i,,n} {a,,j,n} {a,,,k}, such that the link status is set to "True" (i.e. state of complete connection of links in the tree) for all nodes (ST 1320).

With reference to the "water spread" example, in this step, if there are many adequate tunnels to choose from, the ALM forwarding table constructor 218 selects any shortest tunnel. That is to say, in this step, for all links (i, j) in the "rule-based pair list," the ALM forwarding table constructor 218 chooses the link (r, v) with the smallest latency between node pairs (r, v), with respect to all links in the "rule-based pair list."

After choosing the tunnel (r, v), in case there are many potential streams that have reached the starting point r and that may spread to the end point v, the ALM forwarding table constructor 218 selects a stream that will give an acceptable distance from its source k to point v. If the node v has not received the stream rooted at node r, the ALM forwarding table constructor 218 adds the link(r, v) to the node r tree. Otherwise, for one random color k linking nodes from set S[r] and S[v], if the latency (k, v) is equal to or less than the maximum latency, the ALM forwarding table constructor 218 adds a link (r, v) to the tree rooted at k. If no link (r, v) is available for selection (e.g. due to latency violation), the ALM forwarding table constructor 218 tries to choose other links with the next-largest capacity left.

The ALM forwarding table constructor 218 repeats this process until the construction of N-trees is complete for all nodes in the "rule-based ordered list" (ST 1322). Complete N-trees are defined as all nodes in one N-tree are connected to other nodes in N trees for N sources such that content from any one node in one tree can reach all other nodes in other N-trees. This can be achieved either by fulfilling all defined rules from the heuristic rule database 206 or fulfilling the partial rules from the heuristic rule database 206.

Finally, N-tree optimization is carried out as shown in FIG. 15 (ST 1324 to ST 1330). First, N-tree links are moved (ST 1324). This step tries to move the links between pair nodes to minimize the height of the N-trees as illustrated and explained in FIG. 16A. If the N-trees are changed after the links are moved, N trees need to be reconstructed through the following steps starting from ST 1312 (ST 1326). If the reconstruction of N-trees fail due to the move of links, the links are reordered (ST 1328). This step of reordering of links is repeated until the construction of N-trees is complete (ST 1330).

The updated information based on N-tree algorithm will be reflected in the optimal stream path information table 204 and server forwarding table 202 for distribution between client entities (ST 1332).

Figure 16A:
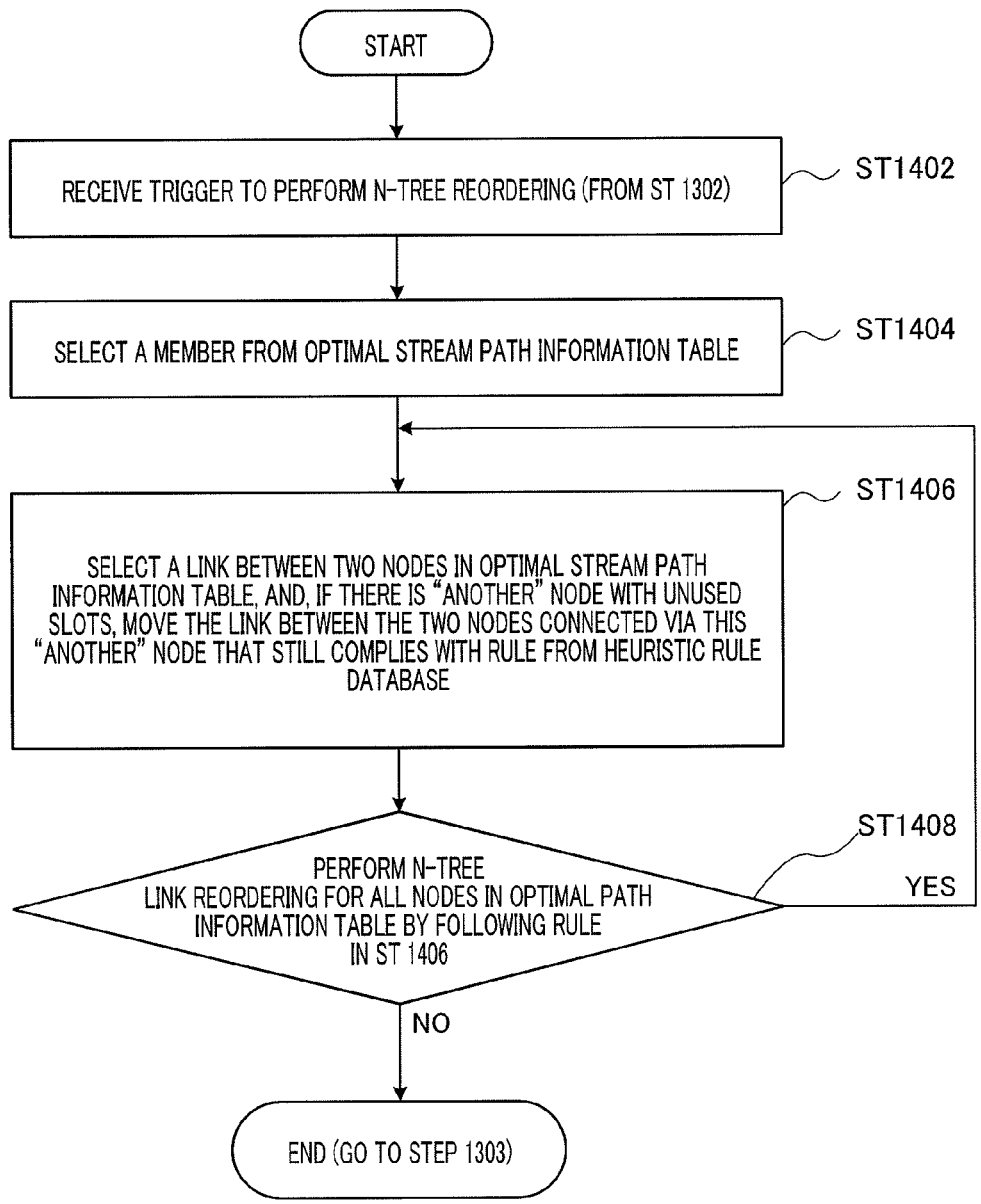
FIG. 16A shows link reordering steps in N-tree algorithm.
Figure 16B:
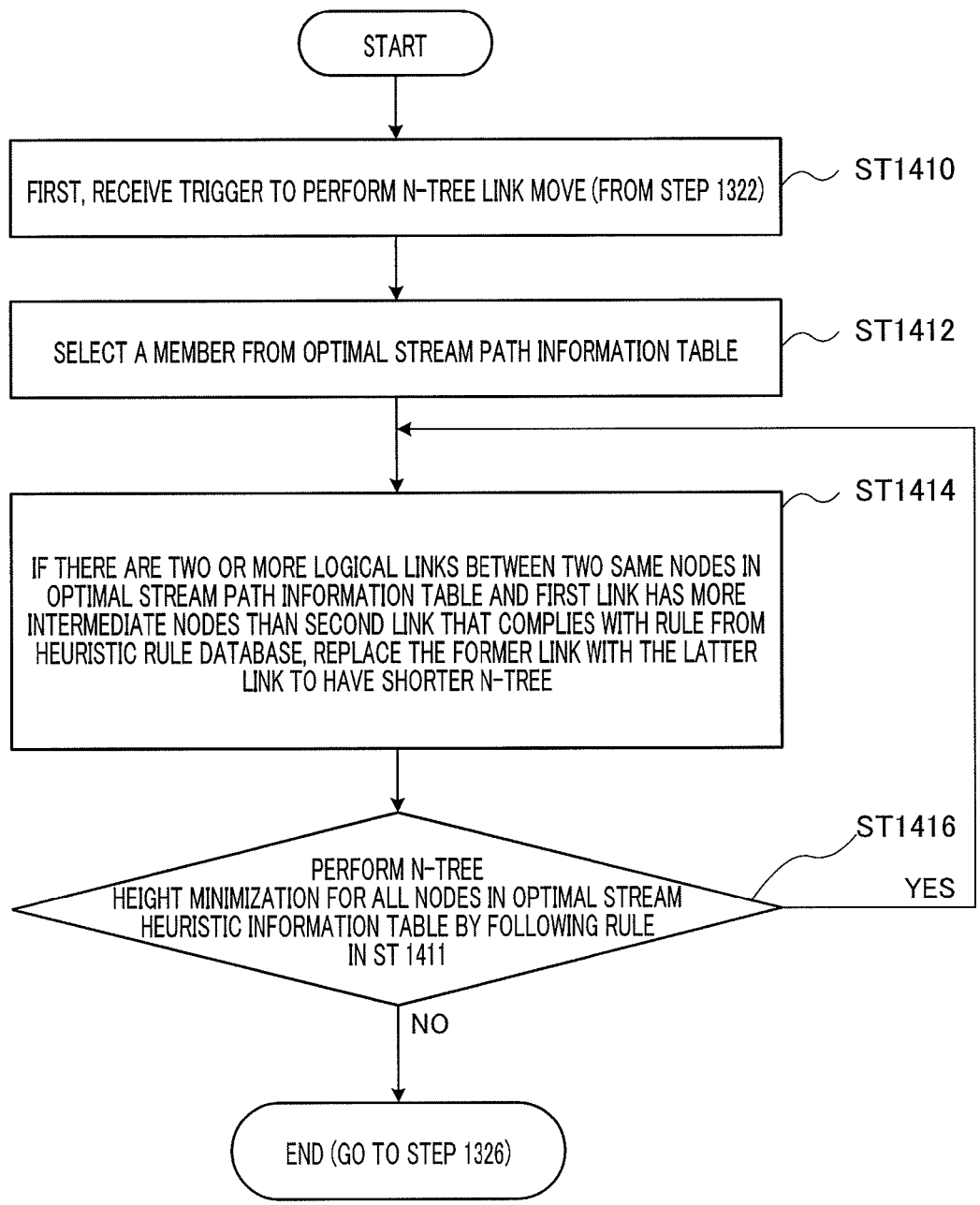
FIG. 16B shows link moving steps in N-tree algorithm.

Next, two N-tree optimization techniques, link moving and link rerouting, are illustrated in FIG. 16A and FIG. 16B in the following paragraphs.

First, using FIG. 16A, the link reordering step in the N-tree algorithm will be described in detail using FIG. 16A. As shown in FIG. 14A, upon receiving a trigger for performing N-tree reordering (ST 1402), the ALM forwarding table 218 selects a member from the optimal stream path information table 204 (ST 1404). If there is a link with an unused bandwidth between two nodes in the optimal stream path table 204, the ALM forwarding table constructor 218 moves the link such that the delay requirement and bandwidth for the new links are still valid with the original rule (ST 1406). Any relationship, that is, the parent-child relationship, grandparent-child relationship and other relationships shown in the optimal stream path information table 204, may apply to the relationship between two nodes. This makes it possible to reorder N-tree links for all nodes in the optimal stream path information table 204 (ST 1408).

Next, the link move step in the N-tree algorithm will be described in detail using FIG. 16B. First, upon receiving a trigger for moving links (ST 1410), the ALM forwarding table constructor 218 selects a member from the optima path stream path information table 204 for link moving purpose (ST 1412). If there are two or more logical links regardless of the parent-child relationship, grandparent-child relationship and other relationships between two identical nodes in the optimal stream path information table 204, the ALM forwarding table constructor 218 compares the first link and the second link such that the delay requirement and the bandwidth between the two nodes on the links become the same. Furthermore, if there are more intermediate nodes, the ALM forwarding table constructor 218 replaces the former link with the latter link so as to have a shorter N-tree (ST 1414). This allows N-tree height minimization for all nodes in the optimal stream path information table 204 (ST 1416).

It is possible that, in exceptional cases, both the moving of links and reordering of links fail for optimization fail with respect to all candidates of nodes during the N-tree construction. With such a scenario, N-tree computation will be incomplete and N-tree algorithm will fail for completion. However, N-tree simulation results show that in 99% of given cases the N-tree algorithm is successful in computing the tree by utilizing the link moving, link reordering technique and heuristic rule database information. Absence of link moving, link reordering techniques and heuristic rule database information on the other hand leads to a success rate of 95% for N-tree building for given cases. The N-tree computation time is less than 50 ms under normal personal computer specification for twelve nodes.

The N-tree height minimization/link moving can be described based on the given "water spread" example as follows; In a tree rooted at any node j, the link to node k from the parent node of node k is disconnected and the replacement of the link from node k to node p does not violate the latency of tree j. In this case, a second parent of node k can be defined as node p that can directly replace the existing patent of node k. Therefore, a node could have N−1 secondary parent sets (corresponding to N−1 trees rooted at other nodes). This is achieved by changing {a,,k=true,,n} (of parent) to {a,, k=false,,n} to remove the link "k" (between pair nodes) from the "rule-based order List" and selecting the link "k'" from the "rule-based order list." In this case, k' is a second parent and therefore selected.

Figure 17:
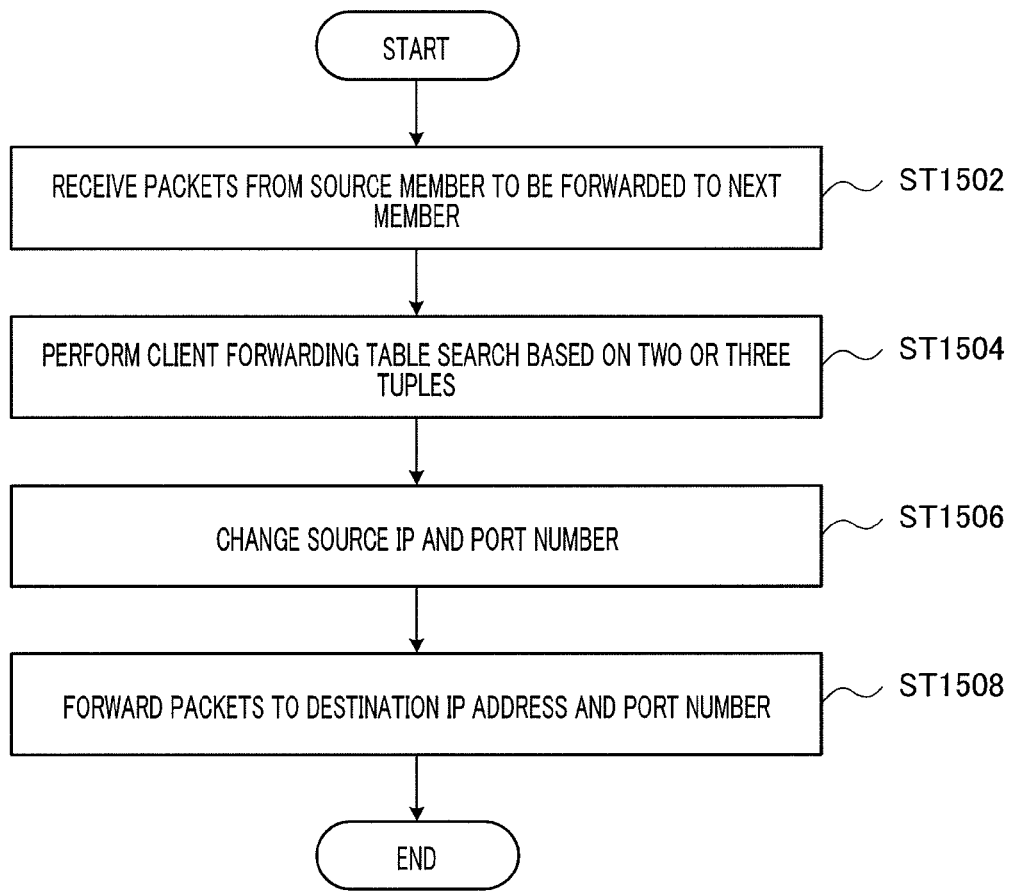
FIG. 17 shows a packet forwarding method by client nodes.

The packet forwarding method by the client node will be described using FIG. 17. First, a client node receives source packets from any other nodes (ST 1502). Next, the client node searches its client forwarding table 236 based two tuples (i.e. combination of IP address and port) or three tuples (combination of IP address port or flag indicating the ALM packet), such as described earlier (ST 1504). The flag or category indicating the ALM packet may be the ToS (Type of Service) field in IPv4 or the DSCP (Differentiated Services Code Point) field or flow label of IPv6, or a combination of these. Furthermore, the flag or category indicating an ALM packet may be a specific field in the UDP payload field.

Next, the client node changes the source IP address and port number of the ALM packet to the current node IP address and port number (ST 1506). This will assure an N-tree constructed path is followed by all network packets leading to bandwidth-fairness between nodes. Finally, the client node forwards the network packet to respective the next destination node (ST 1508).

A specific example of the N-tree algorithm of the present invention will be described using FIG. 18. FIG. 18 illustrates the application of each step of the N-tree algorithm adopting the same network conditions as in FIG. 1 and the resulting network links. The trees based on each node [NY, SG, JP, VN] search for optimal network links, with respect to the defined latency and bandwidth rate sets/slots, from the maximum one complying with the heuristic rules provided to the minimum one. The bandwidth speed set/slot is, for example, 8 Mbps, 4 Mbps, 3 Mbps or 2 Mbps.

The heuristic rules in this case are rules 1 to 4 described above. By this means, as shown in FIG. 18, a path is selected in order from loop 1.

If the construction of one path fails, back-tracking is performed so as to meet the delay requirement, and, in addition, resume the processing for maintaining the fair bandwidth for all nodes.

Figure 18C:
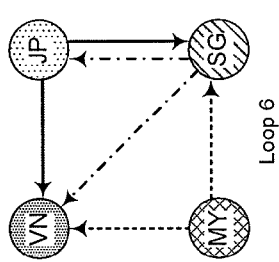
FIG. 18 shows a specific example of the N-tree algorithm of the present invention.
Figure 18F:
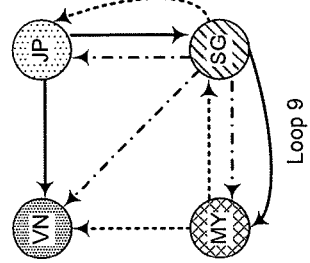
Figure 18I:
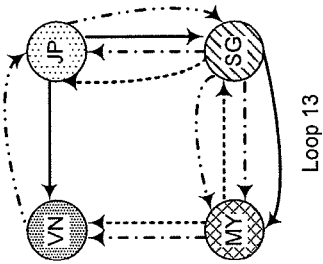
Figure 18B:
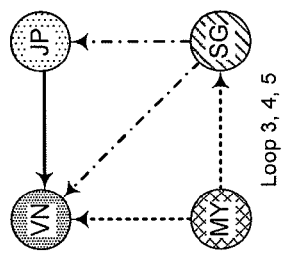
Figure 18E:
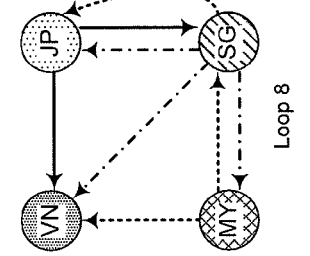
Figure 18H:
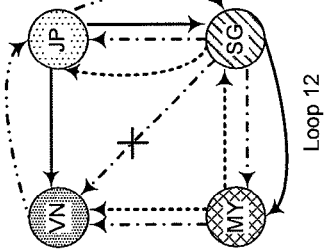
Figure 18A:
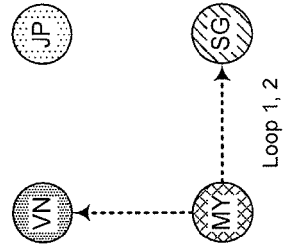
Figure 18D:
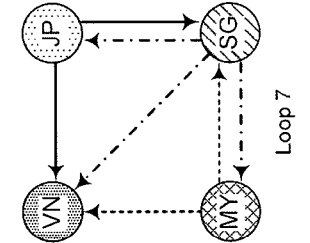
Figure 18G:
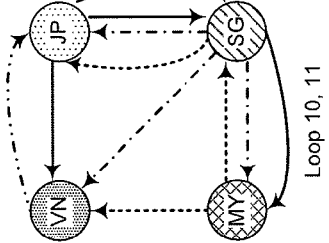

In the case of FIG. 18, if the N-tree algorithm of the present invention is executed, one-to-N distributing trees for N nodes (in this case, N=4) are each calculated as follows:

(1) First, a path (loop 1) is selected through which packets are transmitted directly from MY of the greatest available bandwidth to VN where the delay with MY is the least, in a 8 Mbps bandwidth, and a path (loop 2) is selected through which packets are transmitted directly to SG where the delay with MY is the second least (FIG. 18A). However, the delay D=300 ms between MY and JP exceeds the maximum latency 250 ms, and therefore it is not possible to select a path through which MY can transmit packets directly to JP. As a result, the remaining bandwidth is 20 Mbps for MY, 12 Mbps for SG, 16 Mbps for JP and 6 Mbps for VN.

(2) Next, a path (loop 3) is selected through which packets are transmitted directly from SG having the second largest remaining bandwidth, to VN where the delay with SG is the least, in a 4 Mbps bandwidth, and a path (loop 4) is selected through which packets are transmitted directly to JP where the delay with SG is the second least. At this time, the remaining bandwidth is bigger for JP, so that, next, a loop (loop 5) is selected through which packets are transmitted directly from JP to VN where the delay with JP is the least in a 4 Mbps bandwidth (FIG. 18B). As a result, the remaining bandwidth is 20 Mbps for MY, 12 Mbps for SG, 16 Mbps for JP and 6 Mbps for VN.

(3) Next, a path (loop 6) is selected through which packets are transmitted directly from JP having the second largest remaining bandwidth to SG in a 4 Mbps bandwidth (FIG. 18C). As a result, the remaining bandwidth is 20 Mbps for MY, 12 Mbps for SG, 8 Mbps for JP and 6 Mbps for VN.

(4) Next, a path (loop 7) is selected through which packets are transmitted directly from SP having the second largest remaining bandwidth to MY in a 4 Mbps bandwidth (FIG. 18C). As a result, the remaining bandwidth is 20 Mbps for MY, 8 Mbps for SG, 8 Mbps for JP and 6 Mbps for VN.

(5) Next, a path (loop 8) is selected through which packets are transmitted from MY, which has the greatest remaining bandwidth, to JP, via SG, in a 4 Mbps bandwidth (FIG. 18E). As a result, the remaining bandwidth is 20 Mbps for MY, 4 Mbps for SG, 8 Mbps for JP and 6 Mbps for VN.

(6) Next, a path (loop 9) is selected, through which packets are transmitted from JP, which has the second remaining bandwidth, to MY, via SG, in a 4 Mbps bandwidth (FIG. 18F). As a result, the remaining bandwidth is 20 Mbps for MY, 0 Mbps for SG, 8 Mbps for JP and 6 Mbps for VN.

(7) Next, a path (loop 10) is selected through which packets are transmitted directly to JP in a 4 Mbps bandwidth, and furthermore a path (loop 11) is selected through which packets are transmitted from VN to SG via JP in a 4 Mbps bandwidth. As a result, the remaining bandwidth is 20 Mbps for MY, 0 Mbps for SG, 4 Mbps for JP and 2 Mbps for VN.

Now, given that the remaining bandwidth of SG is 0 Mbps and the remaining bandwidth of VN is 2 Mbps, it is not possible to find a path to go from VN to MY through a 4 Mbps bandwidth.

The N-tree algorithm of the present invention therefore moves onto the process of backtracking to recheck the routes. To be more specific, MY is selected, a link (SG-VN) is removed, and, instead, two links, that is, the paths of (SG-MY) and (MY-VN) in the SG tree are selected (loop 12) (FIG. 18H). As a result, the remaining bandwidth is 16 Mbps for MY, 4 Mbps for SG, 4 Mbps for JP and 2 Mbps for VN.

By this means, it is possible to select a path through which packets can be transmitted from VN to MY via JP and SG in a 4 Mbps bandwidth (loop 13) (FIG. 18(I)). As a result, the remaining bandwidth is 16 Mbps for MY, 0 Mbps for SG, 4 Mbps for JP and 2 Mbps for VN.

By this means, compared to a MST-based method of constructing source-based trees and applying bias towards the shortest delay path, the N-tree algorithm of the present invention makes it possible t construct N source trees at the same time and allocate bandwidth in a fair manner per stream.

For example, although with the conventional method shown in FIG. 2 VN can secure only a 2 Mbps bandwidth, with the N-tree construction method of the present invention shown in FIG. 18, it is possible to secure a 4 Mbps bandwidth for all nodes. That is to say, each node (MY, SG, JP, VN) can construct N-trees at the same time based on fair bandwidth and allowed delay requirement.

The disclosures of Japanese patent application No. 2008-029771, filed Feb. 8, 2008, and Japanese patent application No. 2008-306671, filed Dec. 1, 2008, including the specifications, drawings and abstracts, are incorporated herein by reference in their entirety.

INDUSTRIAL APPLICABILITY

The present invention is suitable for use with AV conference applications where a small group of participants exchange AV stream or content with high degree of interactivity and good AV quality in sessions between participants over networks.

The invention claimed is:

1. A terminal apparatus for setting a packet transmission path between nodes in multipoint-to-multipoint communication, the terminal apparatus comprising:
   a metric collector that, using address information which specifies members participating in the multipoint-to-multipoint communication, measures a bandwidth of a link and a round trip time between the members, and stores measurement results in a metric database;
   an application layer multicast forwarding table constructor that, using the measurement results, forms a packet transmission path (N-tree) between the members, such that bandwidths are equal, and stores the packet transmission path in a server forwarding table;
   an application layer multicast forwarding table distributor that converts the packet transmission path formed by the application layer multicast forwarding table constructor into information including a combination of an incoming port number, a destination address and a destination port number, and reports the information to the members,
   wherein, during an execution of an N-tree algorithm, the application layer multicast forwarding table constructor:

orders all members in a N-tree session, based on a specific heuristic rule stored in a heuristic rule database, and prepares an ordered list;

selects members that have not established links to all the other nodes in the N-tree from a member of the highest order in the ordered list and prepares a rule-based ordered list by ordering the selected members;

forms a pair of nodes by selecting a member from the highest order in the rule-based ordered list and a member from the ordered list satisfying the specific heuristic rule stored in the heuristic rule database, orders the pair of nodes, and prepares a rule pair node ordered list; and selects members satisfying an additional rule stored in the heuristic rule database from a pair of nodes of a highest order in the rule pair node ordered list, and forms the N-trees.

2. The terminal apparatus according to claim 1, wherein, upon forming the pair of nodes, the application layer multicast forwarding table constructor selects a link having a smallest latency between the pair of nodes, from all links in the N-tree session.

3. The terminal apparatus according to claim 1, wherein the application layer multicast forwarding table constructor moves links between the pair of nodes in order to minimize a height of the N-trees.

4. The terminal apparatus according to claim 1, wherein the application layer multicast forwarding table constructor selects a heuristic rule from the heuristic rule database, executes the selected heuristic rule based on an optimal stream path information table, and updates the server forwarding table.

5. The terminal apparatus according to claim 1, wherein the application layer multicast forwarding table constructor selects individual nodes from an optimal stream path information table and constructs the server forwarding table for all streams passing the selected nodes.

6. The terminal apparatus according to claim 1, wherein the heuristic rules stored in the heuristic rule database comprises the rules:
 (a) a node should first use a bandwidth of the node to upload streams of the node rather than carry streams of other nodes, to make possible the N-trees with little latency;
 (b) if a selection is to be made between nodes, a node with a greatest number of remaining slots is selected;
 (c) if a selection is to be made between links, a link with a greatest remaining slot capacity is selected; and
 (d) in rule (c), if there are links having the same number of remaining slots, a link that produces a shortest end-to-end latency in the N-trees is selected.

7. An N-tree construction method comprising:
ordering application layer multicasting members in an initial list with reference to metric collector information and group membership information for all nodes;
ordering the members of the initial list in an ordered list based on a first heuristic rule, for all nodes in N trees;
selecting members from the ordered list satisfying a link connection status with respect to other nodes in the N-trees based on a second heuristic rule and ordering the members in a rule-based ordered list for each N-tree;
selecting, from the members of the rule-based ordered list and the members in the initial list, two members having a logical connection satisfying a third heuristic rule as a node pair and ordering node pairs in the rule-based pair list;
selecting, from node pairs in the rule-based pair list, members satisfying a fourth heuristic rule;
forming an N-tree of a root node selected from the initial list, for all receiving nodes in a group based on a fifth heuristic rule;
assuring connection of all links between nodes of a specific N-tree;
assuring all nodes in the specific N-tree based on nodes of the initial list included in a N-tree configuration; and
assuring all of the N-trees, based on the nodes of the initial list included in a plurality of N-tree configurations.

8. The N-tree construction method according to claim 7, further comprising optimizing the N-trees by moving links and reordering links.

9. The N-tree construction method according to claim 8, wherein the optimizing the N-trees comprises:
reordering N-tree links by, when there is a link between two nodes having an unused bandwidth or slot, moving the link to a different node such that a sixth heuristic rule is still valid; and
moving the N-tree links, if there are two or more logical links between two same nodes and a first link has more intermediate nodes than a second link, such that a seventh heuristic rule is satisfied and the former link is replaced with the latter link to have a shorter N-tree.

10. The N-tree construction method according to claim 7, further comprising updating an optimal stream path information table and a server bandwidth-fair forwarding table with constructed N-tree information.

* * * * *

UNITED STATES PATENT AND TRADEMARK OFFICE
CERTIFICATE OF CORRECTION

PATENT NO. : 8,520,556 B2
APPLICATION NO. : 12/865134
DATED : August 27, 2013
INVENTOR(S) : Karuppiah et al.

It is certified that error appears in the above-identified patent and that said Letters Patent is hereby corrected as shown below:

On the Title Page, at Item (75) Inventors, of the printed patent, "Pek Yew Tan, Singapore (MY)" should read -- Pek Yew Tan, Singapore (SG) --.

Signed and Sealed this
Twelfth Day of November, 2013

Teresa Stanek Rea
*Deputy Director of the United States Patent and Trademark Office*